United States Patent
An et al.

(10) Patent No.: US 11,968,150 B2
(45) Date of Patent: Apr. 23, 2024

(54) METHOD FOR CONTROLLING FREQUENCY BAND FOR COMMUNICATION AND ELECTRONIC DEVICE THEREOF

(71) Applicant: Samsung Electronics Co., Ltd., Gyeonggi-do (KR)

(72) Inventors: Yongjun An, Gyeonggi-do (KR); Soon Park, Gyeonggi-do (KR); Kyuhyuck Kwak, Gyeonggi-do (KR); Janghyun Nam, Gyeonggi-do (KR); Jonghun Yoo, Gyeonggi-do (KR); Taeyun Lee, Gyeonggi-do (KR); Haekwon Lee, Gyeonggi-do (KR); Hyoseok Na, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 197 days.

(21) Appl. No.: 17/576,092

(22) Filed: Jan. 14, 2022

(65) Prior Publication Data

US 2022/0140982 A1    May 5, 2022

Related U.S. Application Data

(63) Continuation of application No. 16/815,641, filed on Mar. 11, 2020, now Pat. No. 11,228,413.

(30) Foreign Application Priority Data

Mar. 11, 2019    (KR) .................. 10-2019-0027286

(51) Int. Cl.
H04W 24/10    (2009.01)
H04B 17/336    (2015.01)
(Continued)

(52) U.S. Cl.
CPC ......... H04L 5/0073 (2013.01); H04B 17/336 (2015.01); H04L 1/0026 (2013.01); H04L 5/006 (2013.01); H04W 24/10 (2013.01)

(58) Field of Classification Search
CPC ..... H04L 5/0073; H04L 5/006; H04L 1/0026; H04W 24/10; H04W 72/0453; H04W 88/06; H04B 17/336
See application file for complete search history.

(56) References Cited

U.S. PATENT DOCUMENTS 9,420,588 B2    8/2016    Wang
9,544,807 B1 *  1/2017    Marupaduga ..... H04W 28/0231
(Continued)

FOREIGN PATENT DOCUMENTS

CN    106576342    4/2017
GB    2 498 800    7/2013
(Continued)

OTHER PUBLICATIONS

NTT DOCOMO, Inc., "IDC Support for IMD and Harmonics Due to Uplink Transmission in MR-DC", R2-1706453, 3GPP TSG-RAN WG2 NR Ad-hoc #2, Jun. 27-29, 2017, 2 pages.
(Continued)

Primary Examiner — Fahmida S Chowdhury
(74) Attorney, Agent, or Firm — The Farrell Law Firm, P.C.

(57) ABSTRACT

An operation method of an electronic device includes determining whether a first communication module based on a first radio access technology (RAT) and a second communication module based on a second RAT operate in a connected state; determining whether a combination of a first band used by the first communication module and a second band used by the second communication module is a combination causing interference; and if the combination
(Continued)

of the first band and the second band is a combination causing interference, transmitting a signal requesting to change one of the first band or the second band. The interference is caused by at least one transmission signal of the first RAT or at least one other signal derived from the at least one transmission signal.

20 Claims, 20 Drawing Sheets

(51) Int. Cl.
*H04L 1/00* (2006.01)
*H04L 5/00* (2006.01)

(56) References Cited

U.S. PATENT DOCUMENTS

| 10,015,792 | B2 | 7/2018 | Choi et al. | |
|---|---|---|---|---|
| 2002/0177414 | A1 | 11/2002 | Shimada et al. | |
| 2007/0183338 | A1 | 8/2007 | Singh et al. | |
| 2010/0060356 | A1* | 3/2010 | Suzuki | H03F 1/3258 |
| | | | | 330/149 |
| 2013/0044621 | A1* | 2/2013 | Jung | H04J 11/005 |
| | | | | 370/336 |
| 2013/0331137 | A1* | 12/2013 | Burchill | H04L 1/20 |
| | | | | 455/501 |
| 2014/0016498 | A1 | 1/2014 | Sharma | |
| 2014/0050146 | A1* | 2/2014 | Chrisikos | H04W 72/542 |
| | | | | 370/328 |
| 2014/0187287 | A1 | 7/2014 | Medapalli | |
| 2014/0334396 | A1 | 11/2014 | Lee et al. | |
| 2015/0065157 | A1 | 3/2015 | Homchaudhuri et al. | |
| 2015/0133185 | A1* | 5/2015 | Chen | H04W 72/1215 |
| | | | | 455/552.1 |
| 2015/0215947 | A1* | 7/2015 | Kaukovuori | H04W 72/541 |
| | | | | 370/329 |
| 2016/0099744 | A1 | 4/2016 | Fu et al. | |
| 2017/0353962 | A1 | 12/2017 | Gao | |
| 2018/0070364 | A1* | 3/2018 | Varanese | H04B 1/1027 |
| 2018/0288765 | A1* | 10/2018 | Chrisikos | H04W 4/90 |
| 2018/0317149 | A1 | 11/2018 | Nabhane et al. | |
| 2018/0317245 | A1 | 11/2018 | Xhafa et al. | |
| 2018/0359760 | A1 | 12/2018 | Su | |
| 2019/0081649 | A1* | 3/2019 | Khlat | H04B 1/40 |
| 2019/0327779 | A1* | 10/2019 | Lee | H04L 5/0098 |
| 2020/0045720 | A1 | 2/2020 | Abdel Shahid | |
| 2020/0205146 | A1* | 6/2020 | Takahashi | H04W 16/14 |
| 2020/0245343 | A1* | 7/2020 | Kim | H04L 1/1854 |
| 2021/0029715 | A1* | 1/2021 | Takahashi | H04W 76/15 |
| 2021/0092662 | A1* | 3/2021 | Takahashi | H04W 36/04 |

FOREIGN PATENT DOCUMENTS

| KR | 1020140005321 | 1/2014 |
|---|---|---|
| WO | WO 2019/031212 | 2/2019 |

OTHER PUBLICATIONS

European Search Report dated Feb. 2, 2022 issued in counterpart application No. 20770314.1-1212, 13 pages.
Indian Examination Report dated Mar. 23, 2022 issued in counterpart application No. 202117045817, 6 pages.
Chinese Office Action dated Apr. 27, 2023 issued in counterpart application No. 202080019781.2, 15 pages.
International Search Report dated Jun. 26, 2020 issued in counterpart application No. PCT/KR2020/003395, 9 pages.
Korean Office Action dated Aug. 17, 2023 issued in counterpart application No. 10-2019-0027286, 14 pages.
Chinese Office Action dated Jan. 10, 2024 issued in counterpart application No. 202080019781.2, 13 pages.
KR Notice of Patent Grant dated Feb. 27, 2024 issued in counterpart application No. 10-2019-0027286, 5 pages.

* cited by examiner

METHOD FOR CONTROLLING FREQUENCY BAND FOR COMMUNICATION AND ELECTRONIC DEVICE THEREOF

PRIORITY

This application is a Continuation Application of U.S. patent application Ser. No. 16/815,641, which was filed in the U.S. Patent and Trademark Office on Mar. 11, 2020, and claims priority under 35 U.S.C. § 119 to Korean Patent Application No. 10-2019-0027286, filed on Mar. 11, 2019, in the Korean Intellectual Property Office, the entire disclosure of each of which is incorporated herein by reference.

BACKGROUND

1. Field

The present disclosure relates generally to an electronic device, and more particularly to an electronic device and method for controlling a frequency band for communication.

2. Description of Related Art

As the performance of an electronic device, such as a smartphone, is improved and users demand an increasing variety of services, the electronic device has come to support a plurality of radio access technologies (RATs). For example, the electronic device may provide not only traditional voice calls, but also cellular communication such as long-term evolution (LTE) and short-range communication such as a wireless local area network (WLAN), Bluetooth, or ultra-wide band (UWB) communication.

Because the electronic device supports various RATs, a user may use one or more RATs suitable for a given environment and service, and two or more RATs may simultaneously be used. If two or more RATs are simultaneously used, radio frequency (RF) signals generated based on two or more RATs may interfere with each other.

Thus, it may be advantageous to provide an electronic device and method for controlling a frequency band for communication in order to avoid interference.

SUMMARY

The present disclosure has been made to address the above-mentioned problems and disadvantages, and to provide at least the advantages described below.

According to an aspect of the disclosure, an operation method of an electronic device includes determining whether a first communication module based on a first RAT and a second communication module based on a second RAT operate in a connected state; determining whether a combination of a first band used by the first communication module and a second band used by the second communication module is a combination causing interference; and if the combination of the first band and the second band is a combination causing interference, transmitting a signal requesting to change one of the first band or the second band. The interference may be caused by at least one transmission signal of the first RAT or at least one other signal derived from the at least one transmission signal.

According to another aspect of the disclosure, an electronic device includes a plurality of antennas; a first communication module based on a first RAT and a second communication module based on a second RAT, each of the first communication module and the second communication module being connected to at least one of the plurality of antennas; and at least one processor connected to the first communication module and the second communication module, wherein the at least one processor is configured to determine whether the first communication module and the second communication module operate in a connected state; determine whether a combination of the first band used by the first communication module and the second band used by the second communication module is a combination causing interference; and if the combination of the first band and the second band is a combination causing interference, transmit a signal requesting to change one of the first band and the second band. The interference may be caused by at least one transmission signal of the first RAT and at least one other signal derived from the at least one transmission signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
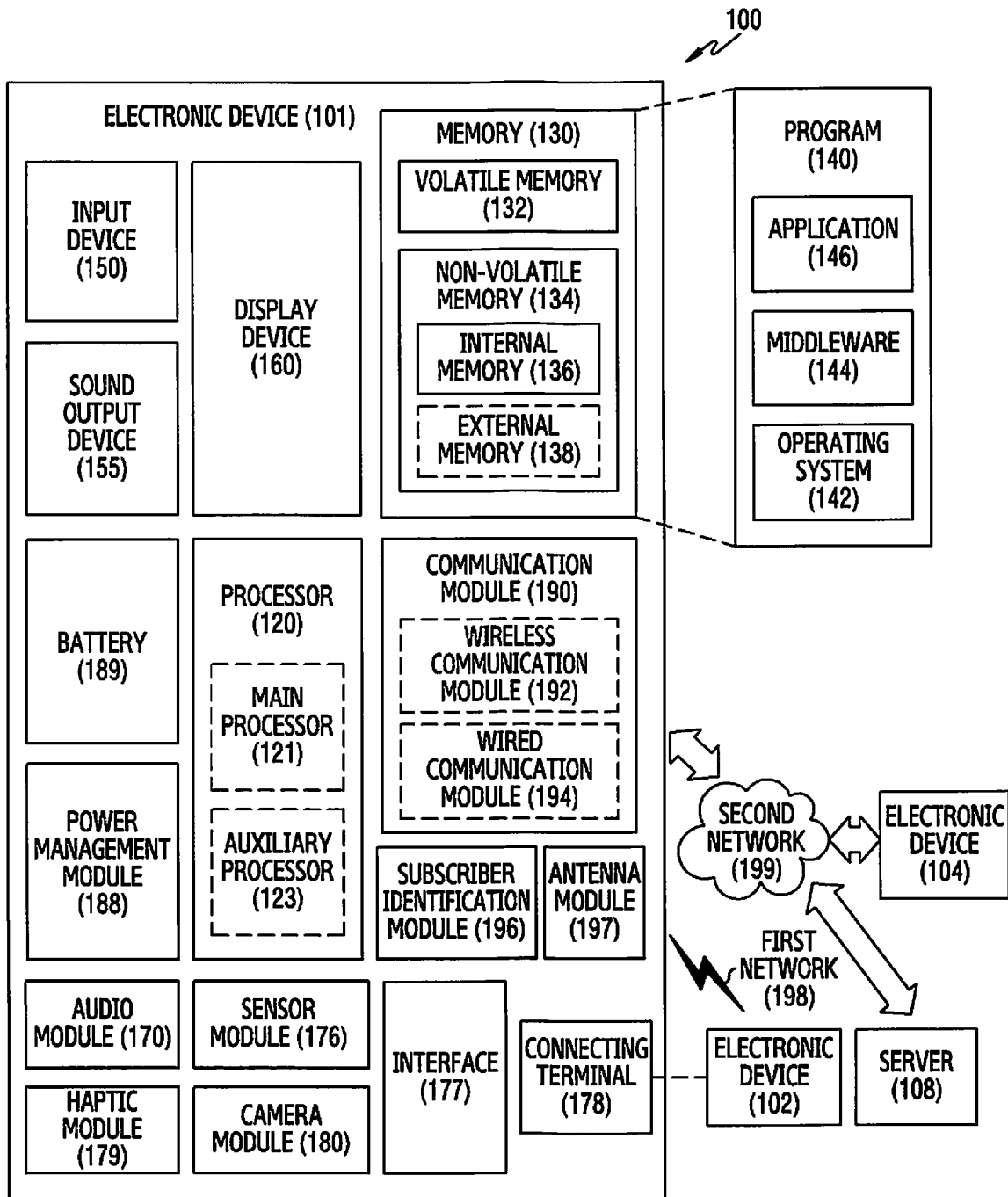
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

A method and an electronic device according to various embodiments may recognize that the occurrence of interference is possible between signals of different RATs and control a frequency band for communication, and thus may avoid a situation in which different RATs using the same band coexist, thereby improving communication performance.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101, The electronic device 101 may provide the outcome, with or without further processing of the outcome, as at least part of a reply to the request. To that end, a cloud computing, distributed computing, or client-server computing technology may be used, for example.

As described with reference to FIG. 1, the communication module 190 of the electronic device 101 may support a plurality of RATs. In order to support a plurality of RATs, the communication module 190 may include circuits (e.g., a CP, a radio-frequency integrated circuit (RFIC), and/or a transceiver) for generating and interpreting signals based on each RAT. Two or more RATs may be simultaneously used. Examples in which two or more RATs are simultaneously being used are the same as those of FIGS. 2A and 2B.

Figure 2A:
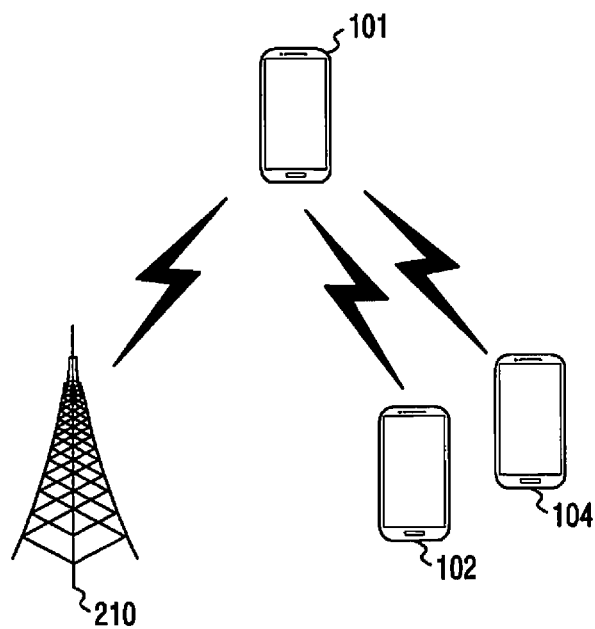
FIG. 2A illustrates an example of a case in which an electronic device simultaneously uses a plurality of RATs, according to an embodiment.

FIG. 2A illustrates an example in which the electronic device 101 simultaneously uses a plurality of RATs, according to an embodiment. FIG. 2A illustrates an example of a case in which the electronic device 101 simultaneously uses a first RAT for cellular communication and a second RAT for wireless LAN communication, according to an embodiment.

Referring to FIG. 2A, the electronic device 101 may communicate with a base station 210 based on the first RAT (e.g., long-term evolution (LTE), LTE-advanced (LTE-A), or 5th generation (5G)), and may communicate with other electronic devices 102 and 104 using the second RAT. For example, the electronic device 101 operates as a mobile hotspot, and thus provides tethering services to other electronic devices 102 and 104 based on the connection with the base station 210.

Figure 2B:
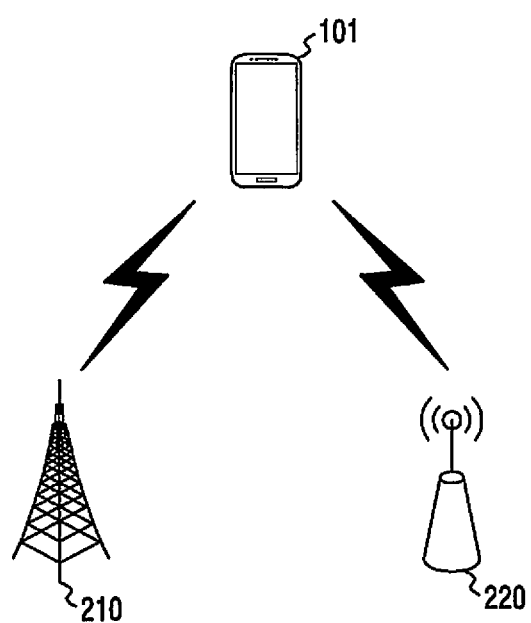
FIG. 2B illustrates an example of a case in which an electronic device simultaneously uses a plurality of RATs, according to an embodiment.

FIG. 2B illustrates an example in which the electronic device 101 simultaneously uses a plurality of RATs, according to an embodiment. Referring to FIG. 2B, the electronic device 101 may communicate with the base station 210 based on the first RAT (e.g., LTE, LTE-A, or 5G), and may communicate with an access point 220 using the second RAT. For example, the electronic device 101 may operate in a boosting mode to perform high-capacity communication using two connections.

In the examples of FIGS. 2A and 2B, a wireless LAN has been proposed as an example of the second RAT. However, the second RAT may be a short-range communication technology, for example, an RAT that is different from Bluetooth or UWB. Communication technologies that may be used as the second RAT may be referred to as a "connectivity technology".

In FIGS. 2A and 2B, an RF signal generated based on the first RAT or another RF signal derived from the RF signal may affect communication based on the second RAT. For example, if the first RAT and the second RAT are used in the same or adjacent bands, for example, if cellular communication based on the first RAT is performed in a B41 or N41 band (defined in Table 1, below) and wireless LAN communication based on the second RAT is performed in a band adjacent to 2.5 gigahertz (GHz), an RF signal for cellular communication may act as direct interference to wireless LAN communication, Additionally or alternatively, even if the first RAT and the second RAT are used in bands that are not the same as or adjacent to each other, another RF signal, which is derived from the RF signal for cellular communication based on the first RAT, may act as interference to wireless LAN communication based on the second RAT. Another RF signal (i.e., a second RF signal), which is derived from the RF signal, may be generated due to the non-linearity of a circuit (e.g., an amplifier). Examples of other derived RF signals (i.e., second RF signals) are shown in FIG. 3.

Figure 3:
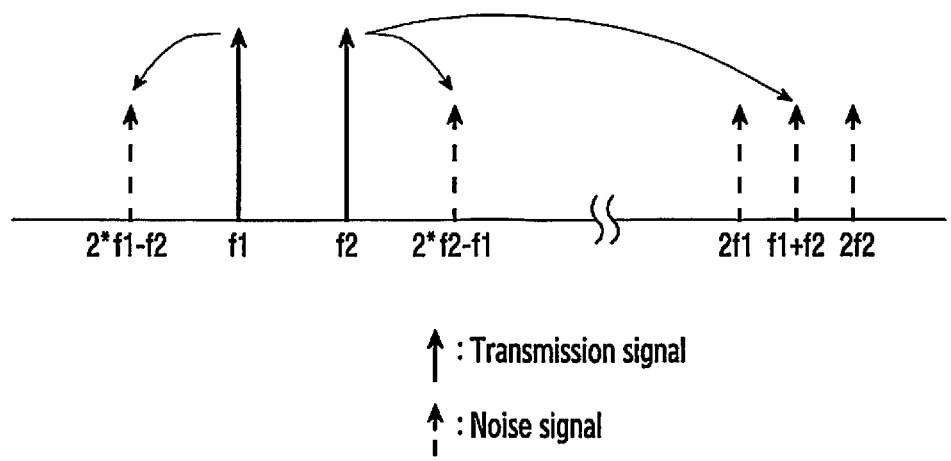
FIG. 3 is an example of signal components generated due to the nonlinearity of a circuit in an electronic device, according to an embodiment.

FIG. 3 is an example of signal components generated due to the nonlinearity of a circuit in an electronic device, according to an embodiment.

Referring to FIG. 3, two transmission signals may be generated at the frequency f1 and the frequency f2. For example, if an uplink carrier aggregation (CA) operation, a dual connectivity (DC) operation, or a multiple input multiple output (MIMO) operation is performed, two transmission signals may be generated. Due to the nonlinearity of active circuits for generating signals, various noise components may occur. For example, noise components may occur at frequencies 2*f1−f2, 2*f2−f1, 2f1, f1+f2, and 2f2 due to intermodulation distortion (IMD) and/or harmonic phenomena.

As described above, a signal generated or a signal derived based on the first RAT, may affect communication based on the second RAT. For example, if the signal generated based on the first RAT is transmitted, the signal of the first RAT is introduced to a circuit supporting the second RAT, through a reception antenna for the second RAT, thereby causing performance degradation. Whether or not the first RAT signal is introduced may depend on the structure of antennas. Hereinafter, examples of arrangements of the antennas will be described with reference to FIGS. 4A, 4B, and 4C.

Figure 4A:
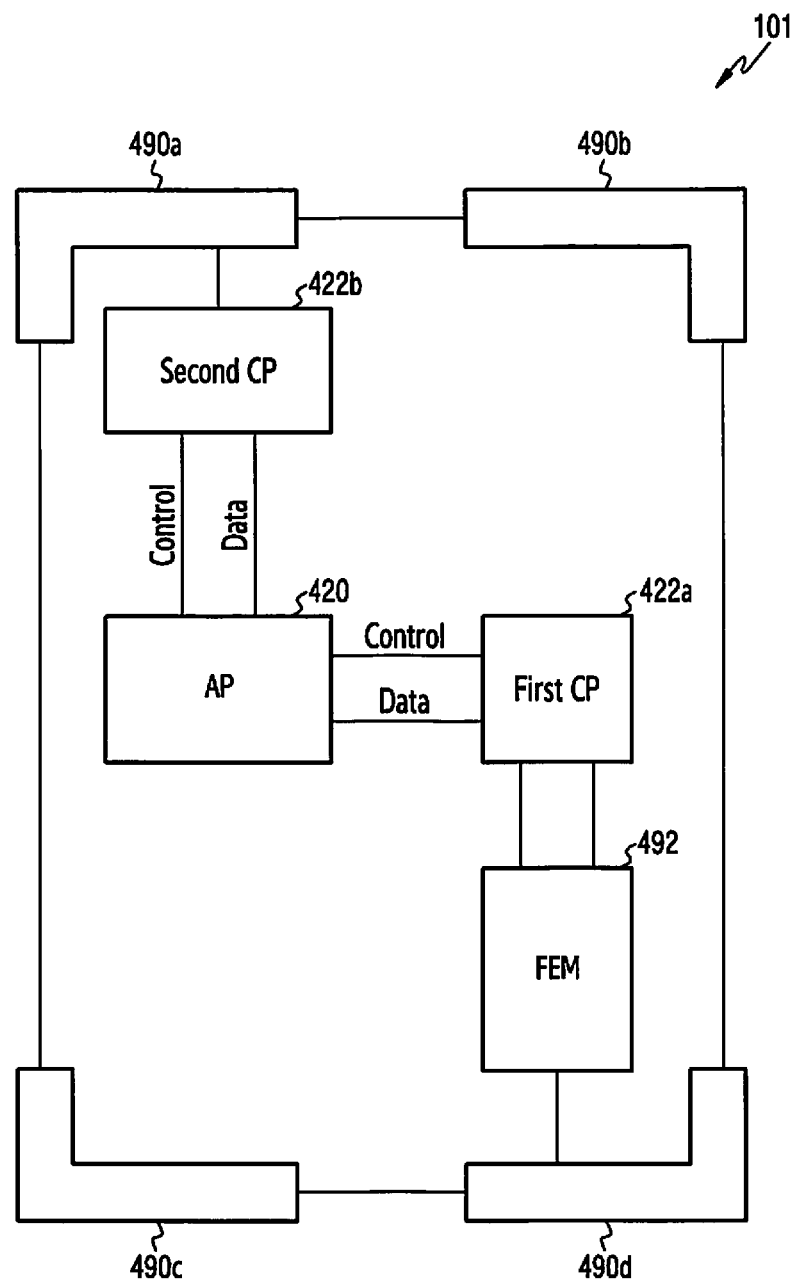
FIG. 4A illustrates an example of a structure in which antenna isolation between RATs is secured in an electronic device, according to an embodiment.

FIG. 4A illustrates an example of a structure in Which antenna isolation between RATs is secured in the electronic device 101, according to an embodiment.

Referring to FIG. 4A, the electronic device 101 includes an AP 420, a first CP 422a, a second CP 422b, a first antenna 490a, a second antenna 490, a third antenna 490a, a fourth antenna 490d and/or a front end module (FEM) 492. The AP 420 is an element configured to perform various data processing or operations, and may correspond to, for example, the processor 120 of FIG. 1. The first CP 422a is an element configured to process a signal, based on the first RAT, for example, the first CP 422a may process a signal for cellular communication. The second CP 422b is an element configured to process a signal, based on the second RAT, for example, the second CP 422b may process a signal for wireless LAN communication. The FEM 492 amplifies a signal based on the first RAT, and may include, for example, at least one of a power amplifier (PA), a low noise amplifier (LNA), a filter, and/or a switch. In the example of FIG. 4A, the signal generated in the first CP 422a is transmitted, via the FEM 492, through the fourth antenna 490d, and the second CP 422b may receive a signal through the first antenna 490a. Since the first antenna 490a and the fourth antenna 490d are disposed relatively distant from each other in the electronic device 101, this may be understood to be the situation in which isolation is secured, that is, in which there is no interference or negligible interference therebetween.

Figure 4B:
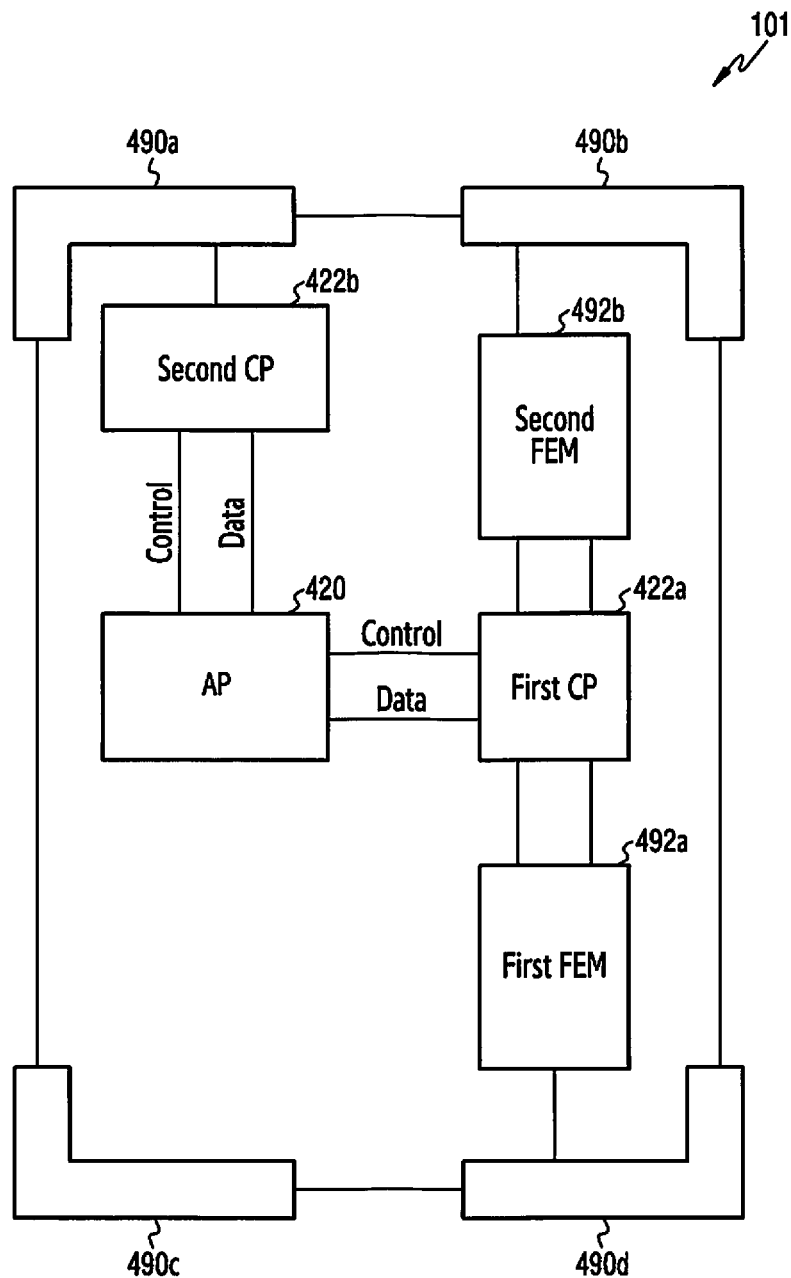
FIG. 4B illustrates an example of a structure in which antenna isolation between RATs is not secured in an electronic device, according to an embodiment.

FIG. 4B illustrates an example of a structure in which antenna isolation between RATs is not secured in the electronic device 101, according to an embodiment.

Referring to FIG. 4B, the electronic device 101 includes an AP 420, a first CP 422a, a second CP 422b, a first antenna 490a, a second antenna 490b, a third antenna 490c, a fourth antenna 490d, a first FEM 492a, and/or a second FEM 492b, The first CP 422a may be connected to the first FEM 492a and the second FEM 492b. A signal generated in the first CP 422a may be transmitted, via the first FEM 492a, through the fourth antenna 490d, or may be transmitted, via the second FEM 492b, through the second antenna 490b. Since the first antenna 490a for receiving the signal of the second RAF and the second antenna 490b for transmitting the signal of the first RAT are disposed adjacent to each other, the antennas are not isolated. In the case of FIG. 4B, the signal of the first RAT, transmitted through the second antenna 490b, may be introduced to the second CP 422b through the first antenna 490a.

Figure 4C:
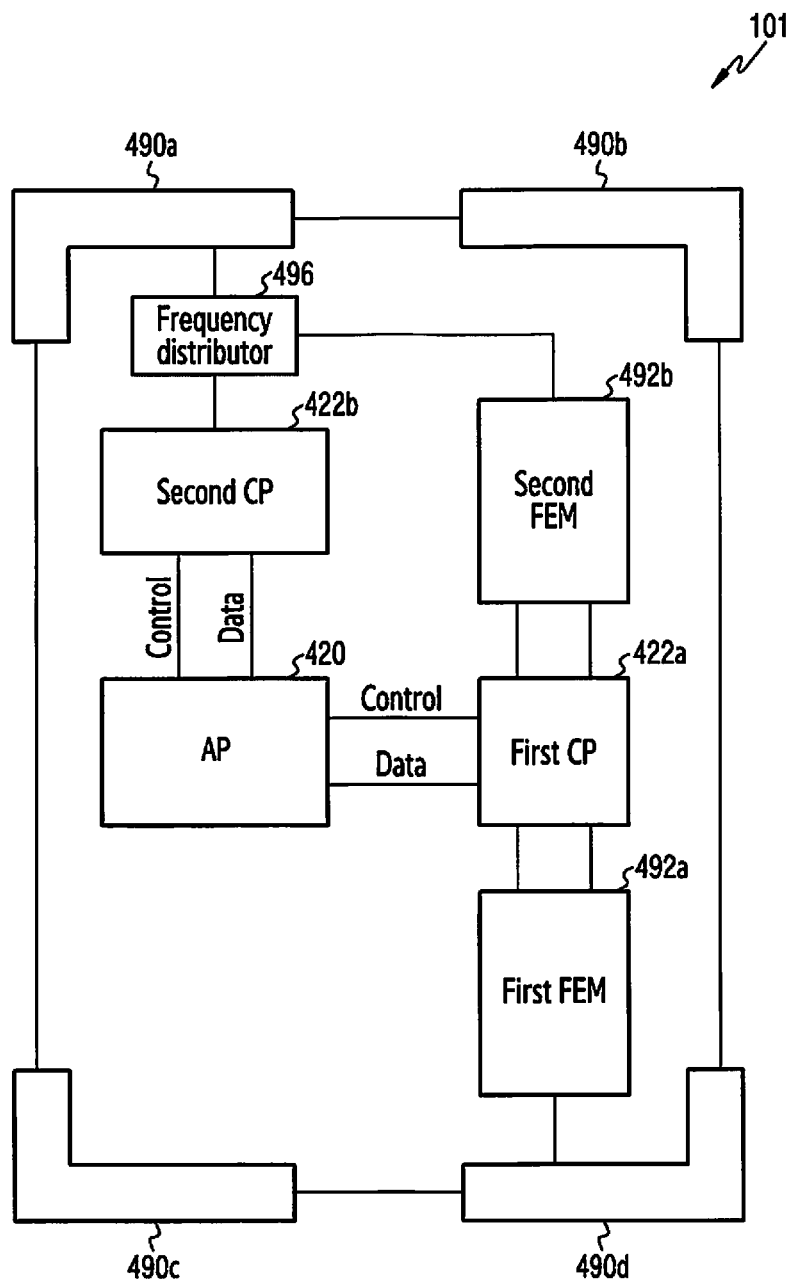
FIG. 4C is an example of a structure in which antenna isolation between RATs is not secured in an electronic device, according to an embodiment.

FIG. 4C is an example of a structure in which antenna isolation between RATs is not secured in the electronic device 101, according to an embodiment.

Referring to FIG. 4C, the electronic device 101 may include an AP 420, a first CP 422a, a second CP 422b, a first antenna 490a, a second antenna 490b, a third antenna 490c, a fourth antenna 490d, a first FEM 492a, a second FEM 492b, and/or a frequency distributor 496. In the example of FIG. 4C, the first CP 422a and the second CP 422b may share the first antenna 490a using the frequency distributor 496. For example, a signal of the first RAT, generated by the first CP 422a, may be transmitted through the first antenna 490a via the second FEM 492b and the frequency distributor 496, and a signal of the second RAT, received through the first antenna 490a, may be input to the second CP 422b via the frequency distributor 496. If the frequency distributor 496 is not ideal, the signal of the first RAT, transmitted through the first antenna 490a, may be introduced to the second CP 422b.

If isolation between antennas is not secured, the signal of the first RAT may be introduced to a circuit (for example, the second CP 422b) that processes the signal of the second RAT. As the number of RATs supported by the electronic device 101 increases, it becomes difficult to secure isolation between antennas, and thus eliminating interference between the first RAT and the second RAT may not be easy using hardware measures (e.g., use of filters and/or securing antenna separation distances). Accordingly, the disclosure describes various embodiments for removing or reducing interference between RATs by means of an operation of controlling frequency bands used for the first RAT or the second RAT.

The electronic device 101 may acquire information about the first RAT and information about the second RAT, and may control the frequency band in consideration of the operating states of the first RAT and the second RAT.

Figure 5A:
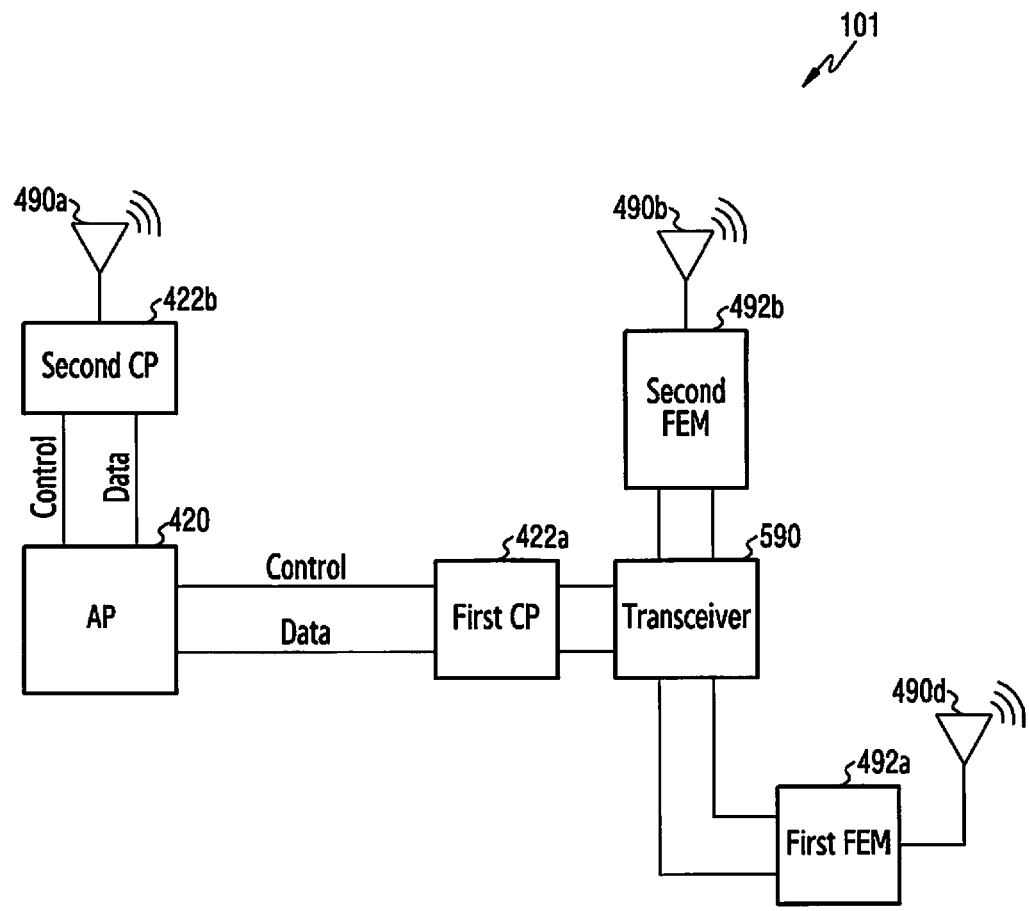
FIG. 5A illustrates an example of a configuration of an electronic device for controlling a frequency band, according to an embodiment.

FIG. 5A illustrates an example of a configuration of an electronic device for controlling a frequency band, according to an embodiment. FIG. SB is an example of a configuration of an electronic device for controlling a frequency band, according to an embodiment. FIG. 5C is an example of a configuration of an electronic device for controlling a frequency band, according to an embodiment. FIG. D is an example of a configuration of an electronic device for controlling a frequency band, according to an embodiment.

Referring to FIG. 5A, the electronic device 101 includes an AP 420, a first CP 422a, a second CP 422b, a first FEM 492a, a second FEM 492b, a first antenna 490a, a second antenna 490b, a fourth antenna 490d, and/or a transceiver 590. In FIG. SA, the AP 420 may perform an operation of controlling a frequency band in consideration of the operating states of the first RAT and the second RAT. Since the AP 420 may transmit/receive data signals and control signals to/from each of the first CP 422a and the second CP 422b, the AP 420 may acquire information about the first RAT and information about the second RAT and control operations and/or states of the first CP 422a and the second CP 422b. Since the AP 420 may control the first CP 422a and the second CP 422b, the AP 420 may identify the state of each of the first CP 422a and the second CP 422b, use interference relationship information or calculate a frequency, and avoid a combination of signals causing an interference problem.

The AP 420 may be replaced by an external microcontroller or another element (e.g., a CP or a chipset), which has a function of recognizing an interference situation through interference relationship information or a calculation. As compared with FIG. 5A, in the examples of FIGS. 5B, 5C, and 5D, the electronic device 101 further includes a control circuit 520 for performing an operation of controlling a frequency band in consideration of the operating states of the first RAT and the second RAT.

Figure 5B:
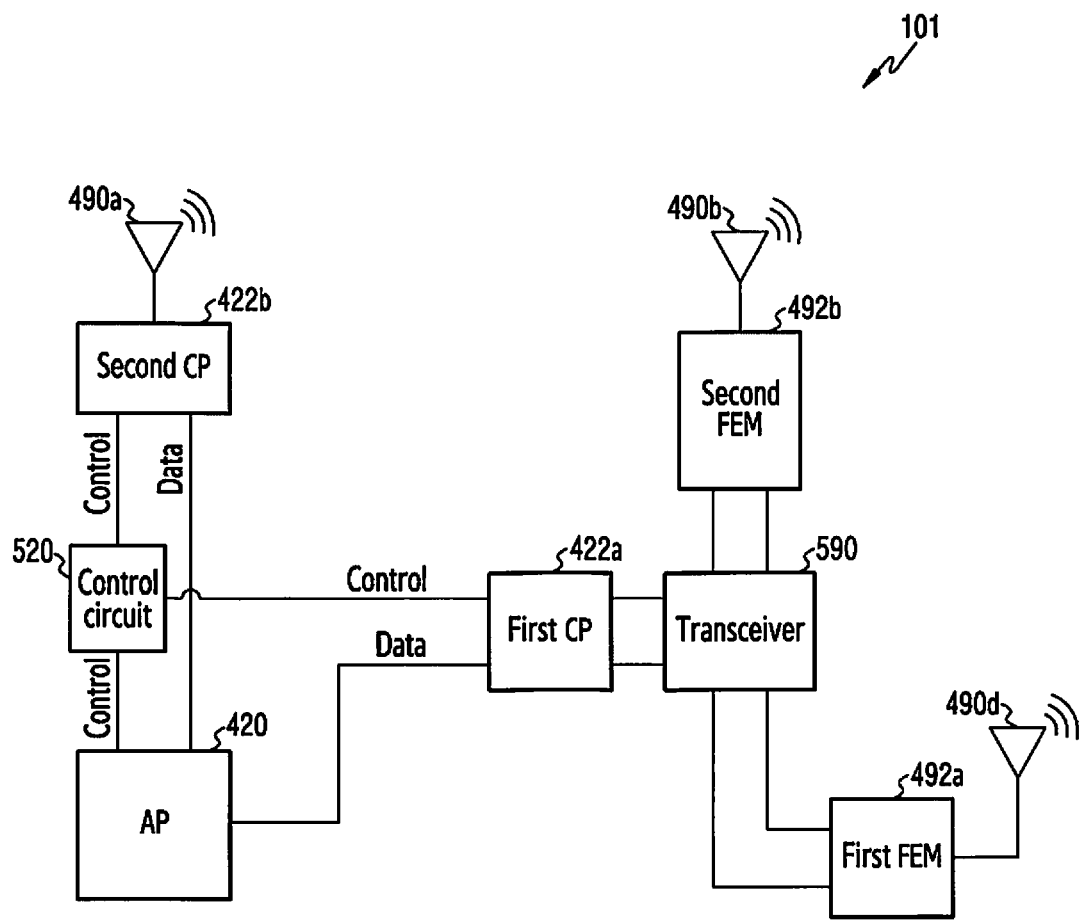
FIG. 5B is an example of a configuration of an electronic device for controlling a frequency band, according to an embodiment.
Figure 5C:
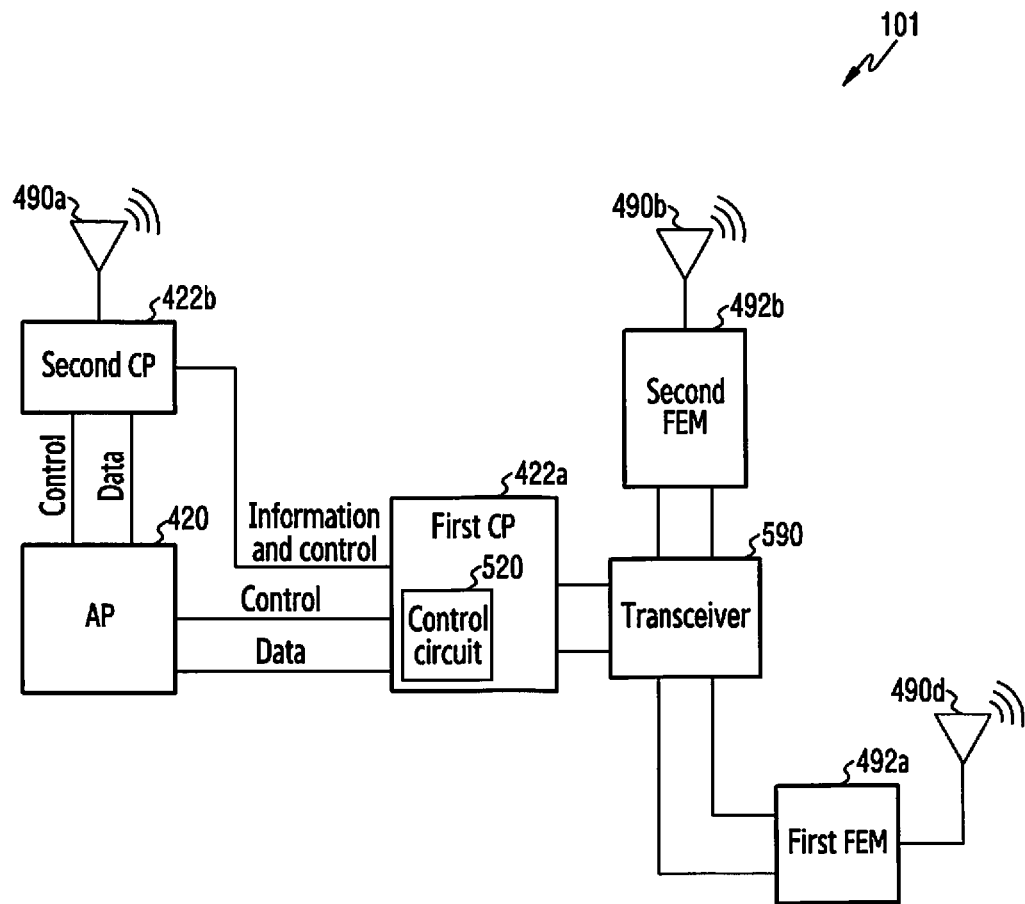
FIG. 5C is an example of a configuration of an electronic device for controlling a frequency band, according to an embodiment.
Figure 5D:
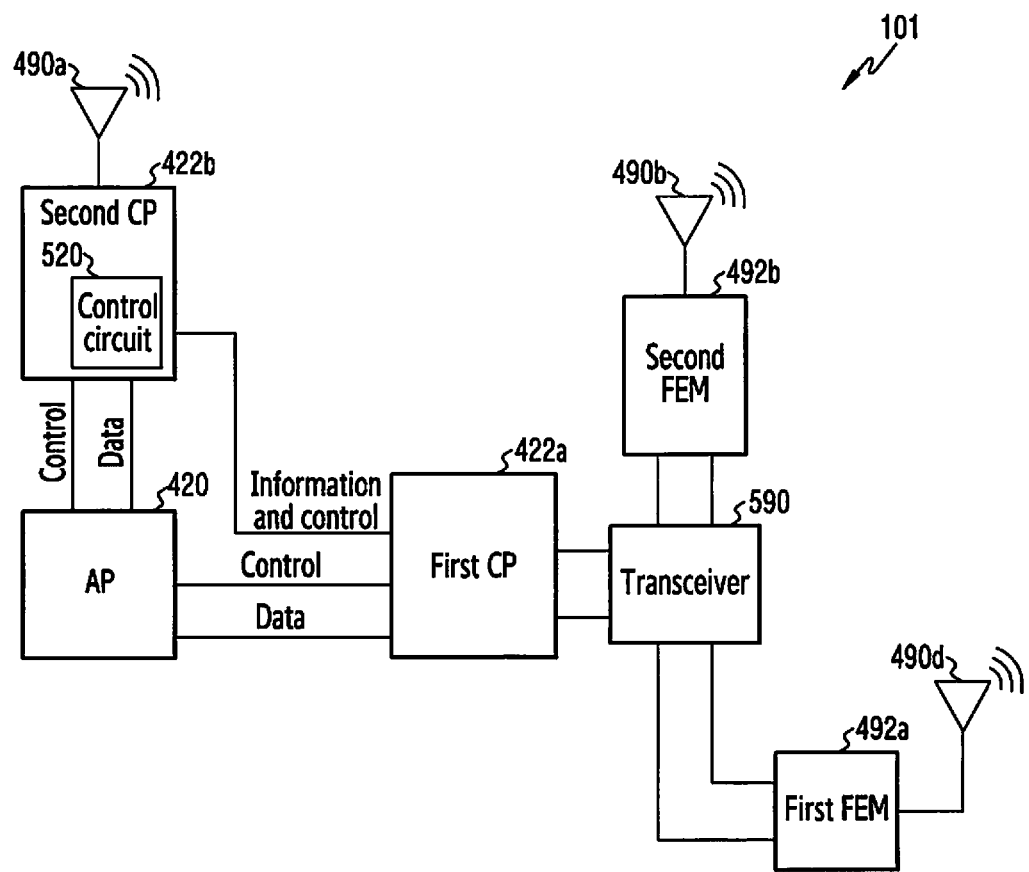
FIG. 5D is an example of a configuration of an electronic device for controlling a frequency band, according to an embodiment.

Referring to FIGS. 5B, 5C, and 5D, the control circuit 520 acquires information about the first RAT and information about the second RAT from the first CP 422a and the second CP 422b, and may control the operations and/or states of the first CP 422a and the second CP 422b. In FIG. 5B, the control circuit 520 is configured as a separate element, in FIG. 5D, the control circuit 520 is configured as a part of the first CP 422a, or in FIG. 5D, the control circuit is configured as a part of the second CP 422b. In the example of FIG. 5A, the control circuit 520 is configured as a part of the AP 420. The control circuit 520 may be referred to as "controller", "microcontroller", "micro control unit" or another term having technical meaning equivalent thereto.

According to an embodiment, an electronic device may include a plurality of antennas; a first communication module based on a first RAT and a second communication module based on a second RAT, each of the first communication module and the second communication module being connected to at least one of the plurality of antennas; and at least one processor connected to the first communication module and the second communication module. The at least one processor is configured to determine whether the first communication module and the second communication module operate in a connected state; determine whether a combination of a first band used by the first communication module and a second band used by the second communication module is a combination causing interference; and if the combination of the first band and the second band is a combination causing interference, transmit a signal requesting to change one of the first band and the second band, wherein the interference may be caused by at least one transmission signal of the first RAT or at least one other signal derived from the at least one transmission signal.

The at least one other signal derived from the at least one transmission signal may be configured to include at least one of a harmonic first component generated due to nonlinearity of the transmission circuit for the first RAT and a second component generated due to intermodulation distortion.

The at least one processor may be configured to identify, based on interference relationship information, whether a combination of the first band and the second band is a combination designated as having an interference relationship.

The at least one processor may be configured to identify, based on interference relationship information, whether a combination of the first band and the second band is a combination designated as having an interference relationship; and identify whether a power of the transmission signal of the first RAT satisfies a condition designated by the interference relationship information.

The plurality of antennas may include a first antenna and a second antenna, the first communication module may be electrically connected to the first antenna, and the second communication module may be electrically connected to the second antenna. The at least one processor may be configured to determine a frequency and a magnitude of the at least one other signal, based on information relating to nonlinearity of a transmission circuit for the first RAF; determine the magnitude of interference which the at least one other signal causes to the second band, based on an isolation level between the first antenna and the second antenna; and identify whether the magnitude of the interference satisfies a designated condition.

The at least one processor may be configured to transmit, to an access point supporting the second RAT, a signal requesting a channel change.

The at least one processor may be configured to transmit a signal indicating deterioration of channel quality of the first band to a base station supporting the first RAT or to transmit a signal indicating deterioration of channel quality of the second band to an access point supporting the second. RAT.

The at least one processor may be configured to transmit a signal indicating a limitation in use of a bandwidth part (BWP) belonging to the first band to a base station supporting the first RAT.

The at least one processor may be configured to identify whether a channel change function of the second RAT is supported; and if the channel change function of the second RAT is not supported, transmit a signal requesting to change the first band used for the first RAT to another band.

The at least one processor may be configured to identify whether a channel change function of the second RAT is supported; and if the channel change function of the second RAT is not supported, transmit a signal indicating deterioration of the channel quality of the second band to an access point supporting the second RAT.

Hereinafter, various embodiments for controlling a frequency band for communication will be described with reference to flowcharts.

Figure 6:
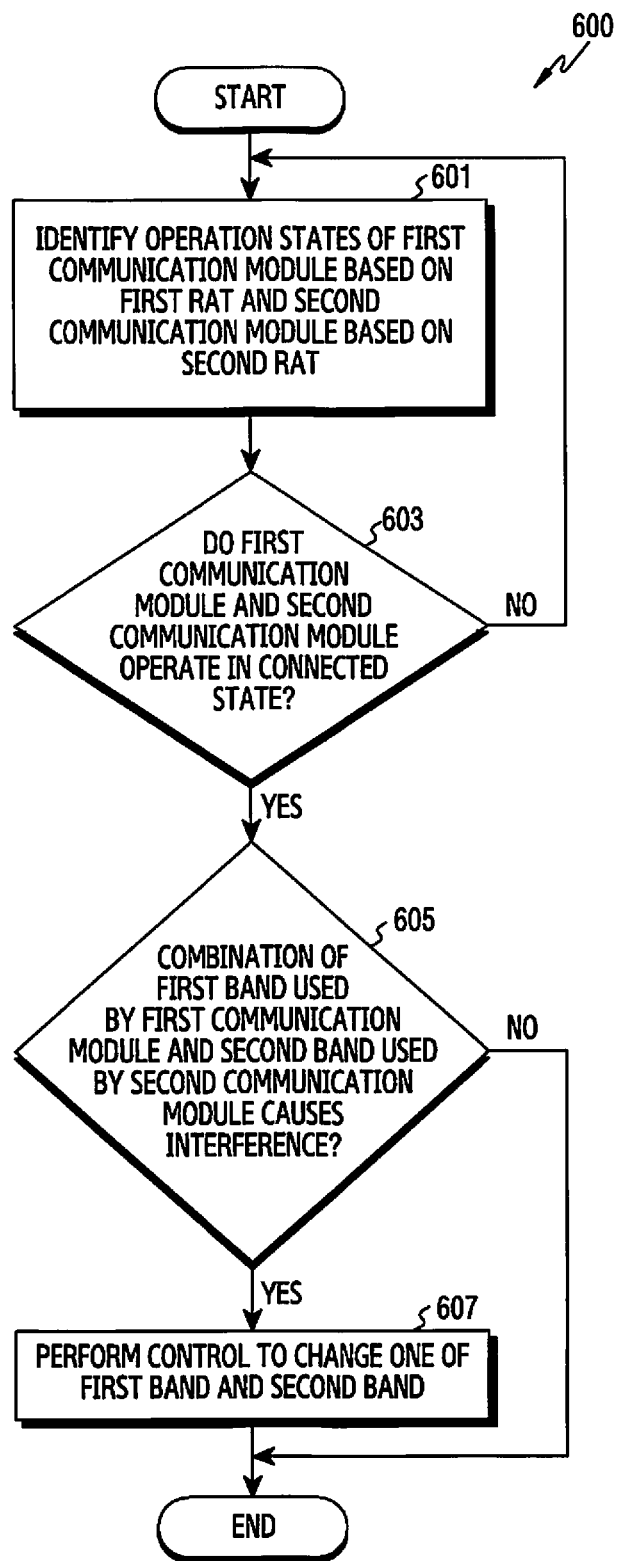
FIG. 6 is a flowchart illustrating an operation of controlling a frequency band for communication in an electronic device, according to an embodiment.

FIG. 6 is a flowchart 600 illustrating an operation of controlling a frequency band for communication in an electronic device, according to an embodiment. The operation entity of the flowchart 600 illustrated in FIG. 6 may be understood to be the electronic device 101 or an element (e.g., the processor 120 or the control circuit 520) of the electronic device 101.

Referring to FIG. 6, in step 601, the electronic device 101 (e.g., the processor 120 or the control circuit 520) identifies operation states of a first communication module (e.g., the first CP 422a) based on the first RAT and a second communication module (e.g., the second CP 442b) based on the second RAT. The operation state may include information on whether each of the first and the second communication modules are connected to a network using the corresponding RAT, whether the corresponding communication module is activated, and/or whether the corresponding communication module is in a state of being capable of transmitting or receiving a signal using the corresponding RAT. For example, in order to identify information about operation states, the electronic device 101 may apply a request signal to the first communication module and the second communication module and identify a response signal to the request signal so as to identify operation states of the corresponding communication modules. Additionally or alternatively, the electronic device 101 may identify the operation states based on power states of the first communication module and the second communication module. In addition, the electronic device 101 may identify the operation states by monitoring data flows of the first communication module and the second communication module.

In step 603, the electronic device 101 identifies whether the first communication module and the second communication module operate in a connected state. The connected state may be a state in which a signal may be transmitted or received to or from a network supporting the corresponding RAT. For example, in a case of a cellular system, the connected state may denote a radio resource control (RRC) connected mode. The electronic device 101 may identify whether the first communication module and the second communication module operate in a connected state, based on the operation state identified in step 601. If the first communication module and the second communication module do not operate in a connected state, the electronic device 101 may return to step 601.

If the first communication module and the second communication module operate in a connected state, in step 605, the electronic device 101 determines whether a combination of the first band used by the first communication module and the second band used by the second communication module is a combination causing interference. The interference may include interference occurring in a case where the first band and the second band at least partially overlap each other or are adjacent to each other, or interference caused by a signal derived from a signal of the first band. For example, the derived signal may include a harmonic component and/or a component due to intermodulation distortion. The electronic device 101 may determine whether the combination of the first band and the second band is a combination causing interference by searching for defined interference relationship information (e.g., a look up table). The electronic device 101 may calculate a characteristic (e.g., a frequency and/or a magnitude) of a signal derived from the signal of the first band, and may determine whether the combination of the first band and the second band is a combination causing interference, based on the calculated characteristic of the signal.

If the combination of the first band and the second band is a combination causing interference (YES in step 605), in step 607, the electronic device 101 changes a status of one of the first band and the second band (e.g., blocks one of the first band and the second band). The electronic device 101 may transmit, to another device (e.g., the base station 210 or the access point 220 of FIG. 2A), a signal requesting changing a status of one of the first band and the second band. For example, the signal may be transmitted to request changing a channel for wireless LAN communication or to request changing a bandwidth part (BWP) for cellular communication. The electronic device 101 may transmit, to another device (for example, the base station or the access point), a signal for inducing one of the first band and the second band to be changed to another band. In step 605, if the combination of the first band and the second band is not a combination causing interference (NO in step 605), the electronic device 101 may end the operation of FIG. 6.

The electronic device 101 may identify whether the first communication module and the second communication module operate in a connected state in a case where the first communication module for the first RAT or the second communication module for the second RAT is switched from an inactive state to an active state. Whether the first communication module and the second communication module operate in a connected state may be periodically identified.

In accordance with FIG. 6, the electronic device 101 may identify whether the combination of the first band and the second band is a combination causing interference in a case in which a change in a situation related to the first RAT or the second RAT occurs (e.g., when the states of the first and/or second RAT change). For example, if the frequency combination used for the first RAT is changed due to a handover operation, a CA operation, or a UL-MIMO operation during communication, the electronic device 101 may determine whether interference occurs and perform an interference avoidance operation. Additionally or alternatively, if the frequency used for the second RAT is changed (for example, in a case of initially using UWB or establishing an access point connection), the electronic device 101 may determine whether interference occurs and perform an interference avoidance operation.

In accordance with FIG. 6, the electronic device 101 may use defined interference relationship information in order to determine the possibility of occurrence of interference. The defined interference relationship information is information indicating a combination that may cause interference between frequency bands usable in the first RAT and frequency bands usable in the second RAT, and may be defined in various formats. The interference relationship information may be stored in an area allocated to a memory 130, may be customized by an engineer in the development stage of the electronic device 101, and may be defined differently depending on the antenna or according to a design.

Interference relationship information relating to a situation in which only one band is used in the first RAT is shown in Table 1, below. Interference relationship information relating to a situation in which multiple bands are used in the first RAT may be defined as shown in Table 2, below the results depend on combinations of bands, and more combinations of bands may be considered according to various embodiments.

TABLE 1

|  | Spurious component | Secondary harmonic component | Tertiary harmonic component |
|---|---|---|---|
| Wireless LAN 2.4 GHz | B40, B41, B7 | N79 |  |
| Wireless LAN 5 GHz | N79 | B7, B41 | B1, B2, B3, B4 |
| Wireless LAN 6 GHz |  | N77, N78 | B1, B40 |
| UWB 6~8.5 GHz |  | N77, N78 | B1, B40 |
| 802.11ay |  | N257 |  |

In Table 1, bands beginning with "B" (e.g., B40 or B1) are bands that are used in an LTE system, wherein B40 may denote 2300 to 2400 megahertz (MHz), B41 may denote 2496-2690 MHz, B7 may denote 2500 to 2570 MHz, B1 may denote 1920 to 1980 MHz, B2 may denote 1850 to 1910 MHz, B3 may denote 1710 to 1785 MHz, and B4 may denote 1710 to 1755 MHz. Bands beginning with "N" (e.g., N79 or N257) are bands that are used in a 5G system, wherein N77 may denote 3300 to 4200 MHz, N78 may denote 3300 to 3800 MHz, N79 may denote 4400 to 5000 MHz, and N257 may denote 26.50 to 29.50 GHz.

TABLE 2

|  | Uplink CA | Evolved Universal Terrestrial Radio Access New Radio (EN)-DC |
|---|---|---|
| Wireless LAN 2.4 GHz | LB + MB | N78 + LB |
| Wireless LAN 5 GHz | HB + HB | N78 + MB |
| Wireless LAN 6 GHz |  | N79 + LB |
|  |  | N77 + HB |
|  |  | N78 + HB |
| UWB 6~8.5 GHz |  | N79 + MB |
|  |  | N79 + HB |
|  |  | N77 + HB |
|  |  | N78 + HB |

In Table 2, a low band (LB) may denote about 1 GHz or less, a middle band (MB) may denote about 1.7 to 2.2 GHz, and a high band (HB) may denote about 2.3 GHz or more. N77 may denote 3300 to 4200 MHz, N78 may denote 3300 to 3800 MHz, and N79 may denote 4400 to 5000 MHz.

Interference relationship information may be defined by further dividing the bands used in the first RAT. For example, the interference relationship information about the harmonic component may be defined as shown in Table 3, below, and the interference relationship information due to a spurious component and/or a leakage component may be defined as shown in Table 4, below

TABLE 3

| Secondary Harmonic | Cell band | | | |
|---|---|---|---|---|
| Wireless LAN | N77/N78 | | | ... |
| 6 GHz | 3300 MHz | 3350 MHz | ... | ... |
| Channel 11 |  |  |  |  |
| Channel 12 |  |  |  |  |
| Channel 13 | ○ | ○ |  |  |
| Channel 14 | ○ | ○ |  |  |
| Channel 15 |  |  |  |  |
| Channel 16 |  |  |  |  |
| Channel 17 |  |  |  |  |
| Channel 18 |  |  |  |  |

TABLE 4

| Spurious Component | Cell band | | | | | | | | |
|---|---|---|---|---|---|---|---|---|---|
| Wireless | B40 | | | | B41 | | | | ... |
| LAN 2 GHz | ... 2370 | ... 2399 | 2400 | 2496 | ... | 2520 | ... | 2690 | ... |
| Channel 11 | ○ | ○ | ○ | ○ |  |  |  |  |  |
| Channel 12 |  | ○ | ○ |  |  |  |  |  |  |
| Channel 13 |  |  |  |  |  |  |  |  |  |
| Channel 14 |  |  |  |  |  |  |  |  |  |
| Channel 15 |  |  |  |  |  |  |  |  |  |
| Channel 16 |  |  |  |  |  |  |  |  |  |
| Channel 17 |  |  |  |  |  |  |  |  |  |
| Channel 18 |  |  |  |  |  |  |  |  |  |

TABLE 4-continued

| Spurious Component | Cell band | | | | | | | | |
|---|---|---|---|---|---|---|---|---|---|
| Wireless | B40 | | | | B41 | | | | ... |
| LAN 2 GHz | ... 2370 | ... | 2399 | 2400 | 2496 | ... | 2520 | ... 2690 | ... |
| Channel 19 | | | | | | | | | |
| Channel 20 | | | | | | | | | |
| Channel 21 | | | | | ○ | | | | |
| Channel 22 | | | | | ○ | | ○ | ○ | |
| Channel 23 | | | | | ○ | | ○ | ○ | |

In Table 3 and Table 4, combinations (e.g., a channel and cell band) marked "a" may be understood to be combinations causing interference.

As described above, the interference relationship information may designate at least one combination, which is a combination causing interference, among combinations of bands used for the first RAT and bands used for the second RAT. The interference relationship information may indicate not only interference caused by a signal in a transmission band, but also interference caused by a signal (e.g., a harmonic component and/or an intermodulation distortion component), which is generated outside the transmission band by the signal in the transmission band. The interference relationship information may be stored and utilized in a memory 130 of the electronic device.

The interference relationship information may differ according to the characteristics of the electronic device (for example, nonlinearity of the transmission circuit). For example, the interference relationship information valid for an electronic device (e.g., a first model) according to a first design may not be valid for another electronic device (e.g., a second model) according to a second design. Therefore, depending on the design of the electronic device, interference relationship information corresponding thereto may be stored. Interference relationship information that takes into consideration a plurality of designs is defined and stored, and the electronic device may use a subset of the interference relationship information (e.g., some rows and some columns of the lookup table).

The interference relationship information described above may designate combinations of bands causing interference. The interference relationship information may further designate a threshold for transmission power in addition to the combination of bands. Even if bands corresponding to combinations defined according to the interference relationship are used, as long as the power of a transmission signal of the first RAT is small enough, interference may not occur. Since the occurrence or nonoccurrence of interference may differ depending on the power of the transmission signal of the first RAT, even if a combination of bands having a possibility of interference is used, the electronic device 101 may additionally consider whether the power of the transmission signal of the first RAT exceeds the threshold designated by the interference relationship information. For example, if a combination of bands having a possibility of interference is used, and if the power of the transmission signal of the first RAT exceeds the threshold designated by the interference relationship information, the electronic device 101 recognizes the possibility of the interference, and may perform an interference avoidance operation (e.g., step 607).

With reference to FIG. 6, the electronic device 101 may calculate a characteristic (e.g., a frequency and/or a magnitude) of a signal derived from a signal of a first hand, and may determine whether the combination of the first hand and the second band is a combination causing interference, based on the calculated characteristic of the signal. To this end, the electronic device 101 may calculate harmonic characteristics and MID characteristics (e.g., a frequency and/or a magnitude) of the transmission signal of the first RAT, using information about isolation between antennas and information about linearity of a transmission circuit (e.g., an amplifier) for the first RAT. The information about isolation may be stored in one area allocated in a memory 130, and the information about the linearity of the transmission circuit may be stored in another area allocated in the memory 130.

Additionally, with reference to FIG. 6, the electronic device 101 may change one of the first band and the second band. If the electronic device 101 operates as an access point 220, the electronic device 101 may be configured not to use a channel subjected to interference. If the electronic device 101 is connected to an access point 220 as a slave, the electronic device 101 may transmit a signal reporting that the quality of the channel currently being used is poor so as to induce a change to a channel in another band, or may transmit a signal requesting a channel change by using a communication protocol for interference avoidance. The electronic device 101 may attempt to change a second band used for a second RAT, and if changing the second band is not possible, the electronic device 101 may attempt to change the first band used for the first, RAT. For example, in order to change the first band, the electronic device 101 may transmit, to a base station 210, a signal reporting that the quality of the channel currently being used is poor, and thus induce handover to another band. In order to change the first band, the electronic device 101 reports a BWP, which is a frequency use unit supported by the first RAT, to the base station 210, so that the electronic device 101 may use a band that does not apply interference to the received signal of the second RAT. For example, in a case of transmitting capability information about a channel, the electronic device 101 may induce a change to another band by excluding a band currently being used from available BWPs.

As described above, various embodiments related to interference avoidance may include an operation of recognizing an interference situation and/or an operation of performing interference avoidance. The operation of recognizing the interference situation and the operation of performing the interference avoidance may be variously defined, and various scenarios based on a combination of at least some of various embodiments described above may be derived. Hereinafter, with reference to FIGS. 7 to 12, various frequency band control scenarios that can be derived from the above-described embodiments will be described.

Figure 7:
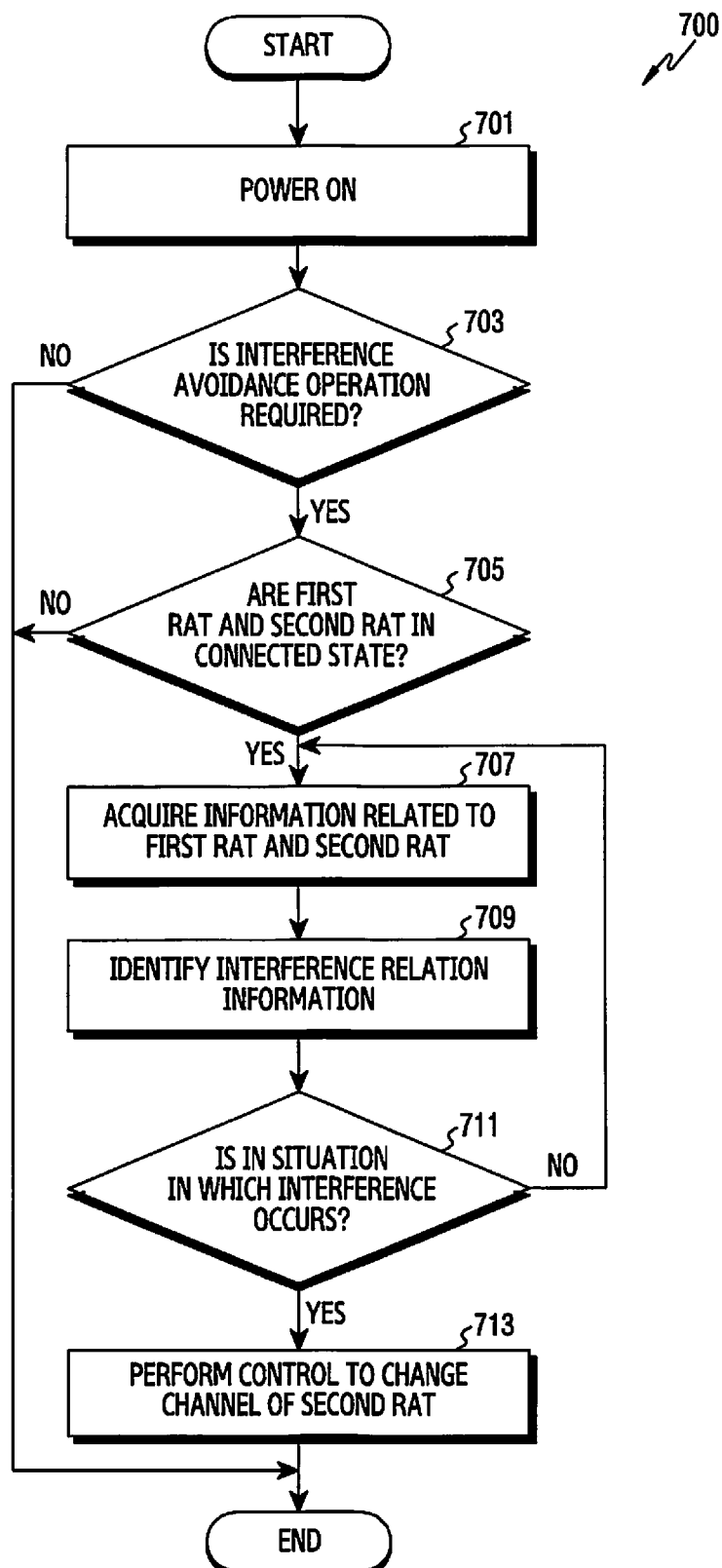
FIG. 7 is a flowchart illustrating an operation of controlling a frequency band for communication based on predefined interference relationship information in an electronic device, according to an embodiment.

FIG. 7 is a flowchart 700 illustrating an operation of controlling a frequency band for communication based on predefined interference relationship information in an electronic device, according to an embodiment. The entity performing the operations in the flowchart 700 illustrated in FIG. 7 may be the electronic device 101 or an element (e.g., the processor 120 or the control circuit 520) of the electronic device 101.

Referring to FIG. 7, in step 701, the electronic device 101 (e.g., the processor 120 or the control circuit 520) is powered on. When a power button provided in the electronic device 101 is pressed, the electronic device 101 may be powered on.

In step 703, the electronic device 101 determines whether an interference avoidance operation is required. The interference avoidance operation may be an operation of performing frequency band control to use a combination of bands which are not in an interference relationship. For example, if isolation between an antenna for transmitting a signal of a first RAT and an antenna for receiving a signal of a second RAT is secured, an interference avoidance operation may not be required. If the interference avoidance operation is not required, the electronic device 101 ends the operation.

If an interference avoidance operation is required, in step 705, the electronic device 101 identifies whether the first RAT and the second RAT are in a connected state. The electronic device 101 may acquire information about an operation state of a first communication module (e.g., the first CP 422a) based on the first RAT and information about an operation state of a second communication module (e.g., the second CP 442b) based on the second RAT, and may identify whether the first RAT and the second RAT are in a connected state, based on the acquired information. If the first RAT and the second RAT are not in a connected state, the electronic device 101 ends the operation.

If the first RAT and the second RAT are in a connected state, in step 707, the electronic device 101 acquires information related to the first RAT and the second RAT. For example, the electronic device 101 may identify the first band used for the first RAT and the second band used for the second RAT.

In step 709, the electronic device 101 identifies interference relationship information. The electronic device 101 may read interference relationship information stored in the memory 130. The interference relationship information may be information indicating a combination causing interference, among possible combinations of the band of the first RAT and the band of the second RAT. For example, the interference relationship information may be defined in Table 1, Table 2, Table 3, or Table 4. If the interference relationship information includes information about a plurality of designs, the electronic device 101 may identify a subset valid for the electronic device 101 from the interference relationship information.

In step 711, the electronic device 101 determines whether it is in a situation in which interference occurs. The electronic device 101 may identify whether the combination of the first band and the second band, identified in step 707, is a combination designated as having an interference relationship based on the interference relationship information or a subset of the interference relationship information. If the electronic device 101 is not in a situation in which interference occurs, the electronic device 101 returns to step 707.

If the electronic device 101 is in a situation in which interference occurs, the electronic device 101 changes the channel of the second RAT in step 713. The electronic device 101 may control the second communication module to use a band other than the second band. For example, the electronic device 101 may block the second band or transmit a signal allowing change of a channel to a serving node (e.g., an access point) of the second RAT.

Figure 8:
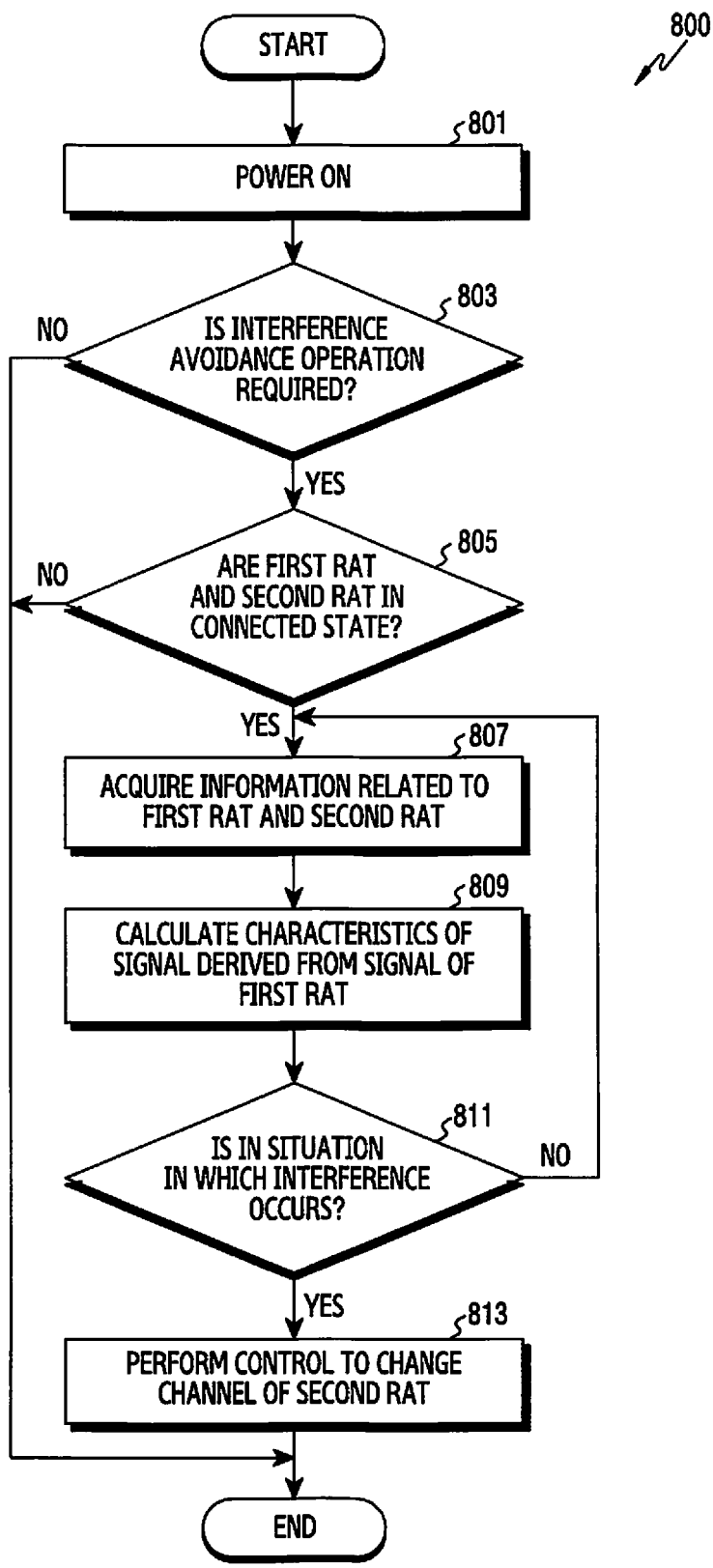
FIG. 8 is a flowchart illustrating an operation of controlling a frequency band for communication based on a calculation result based on circuit characteristics in an electronic device, according to an embodiment.

FIG. 8 is a flowchart 800 illustrating an operation of controlling a frequency band for communication based on the result of a calculation based on circuit characteristics in an electronic device, according to an embodiment. The entity performing the operations in the flowchart 800 illustrated in FIG. 8 may be the electronic device 101 or an element (e.g., the processor 120 or the control circuit 520) of the electronic device 101.

Referring to FIG. 8, in step 801, the electronic device 101 (e.g., the processor 120 or the control circuit 520) is powered on. When a power button provided in the electronic device 101 is pressed, the electronic device 101 may be powered on.

In step 803, the electronic device 101 determines whether an interference avoidance operation is required. The interference avoidance operation may be an operation of performing frequency band control to use a combination of bands which are not in an interference relationship. For example, if isolation between an antenna for transmitting a signal of the first RAT and an antenna for receiving a signal of the second RAT is secured, an interference avoidance operation may not be required. If the interference avoidance operation is not required, the electronic device 101 ends the operation.

If an interference avoidance operation is required, in step 805, the electronic device 101 identifies whether the first RAT and the second RAT are in a connected state. The electronic device 101 may acquire information about an operation state of the first communication module (e.g., the first CP 422a) based on the first RAT and information about an operation state of the second communication module (e.g., the second CP 442b) based on the second RAT, and may identify whether the first RAT and the second RAT are in a connected state, based on the acquired information. If the first RAT and the second RAT are not in a connected state, the electronic device 101 ends the operation.

If the first RAT and the second RAT are in a connected state, in step 807, the electronic device 101 acquires information related to the first RAT and the second RAT. For example, the electronic device 101 may identify the first band used for the first RAT and the second band used for the second RAT.

In step 809, the electronic device 101 calculates the characteristics of a signal derived from the signal of the first RAT. The characteristics of the signal may include a frequency and a magnitude (e.g., a power level). The electronic device 101 stores, in the memory 130, information related to nonlinearity of a transmission circuit (for example, an amplifier) for the first RAT, and may calculate the frequency and/or the magnitude of the signal derived from the signal of the first RAT, based on the stored information. For example, the electronic device 101 may calculate the frequency and the power level of a signal generated due to the nonlinearity, such as intermodulation distortion from the third order (IMD3), harmonics, and/or intermodulation distortion from the second order (IMD2), based on the stored nonlinearity-related information and the frequency and power of the transmission signal of the first RAT. In addition, the electronic device 101 may calculate the magnitude of interference affecting the antenna for the second RAT, based on the calculated values and an isolation level between the antennas.

In step 811, the electronic device 101 determines whether it is in a situation in which interference occurs. The electronic device 101 may identify whether interference is applied to the second band used for the second RAT, based on the characteristics of the derived signal, which is calculated in step 809. The electronic device 101 may determine whether it is in a situation in which interference occurs, based on whether the frequency of the derived signal is included in the second band, and the ratio of the magnitude of the derived signal and the magnitude of the signal of the second RAE For example, the electronic device 101 may determine whether the magnitude of non-linear leakage components, such as IMD3, harmonics, and/or IMD2, which affect a reception band of the second RAT, exceed corresponding thresholds. If the electronic device 101 is not in a situation in which interference occurs, the electronic device 101 returns to step 807.

If the electronic device 101 is in a situation in which interference occurs, in step 813, the electronic device 101 changes the channel of the second RAT. The electronic device 101 may control the second communication module to use a band other than the second band. For example, the electronic device 101 may block the second band or transmit a signal allowing change of a channel to a serving node (e.g., an access point) of the second RAT.

Figure 9:
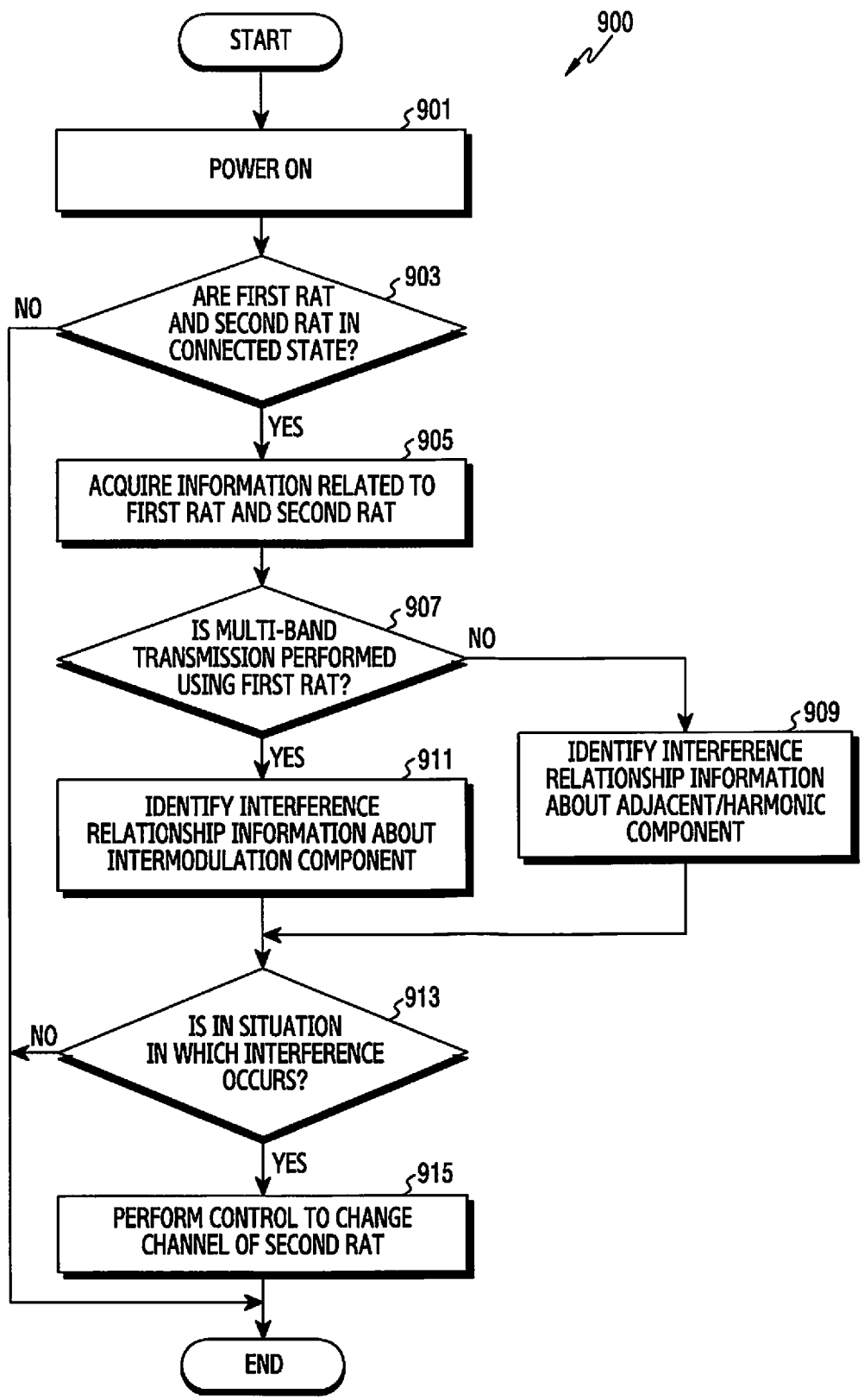
FIG. 9 is a flowchart illustrating an operation of controlling a frequency band for communication in consideration of multi-band transmission in an electronic device, according to an embodiment.

FIG. 9 is a flowchart 900 illustrating an operation of controlling a frequency band for communication in consideration of multi-band transmission in an electronic device, according to an embodiment. The entity performing the operations in the flowchart 900 illustrated in FIG. 9 may be the electronic device 101 or an element (e.g., the processor 120 or the control circuit 520) of the electronic device 101.

Referring to FIG. 9, in step 901, the electronic device 101 (e.g., the processor 120 or the control circuit 520) is powered on. When a power button provided in the electronic device 101 is pressed, the electronic device 101 may be powered on.

In step 903, the electronic device 101 identifies whether the first RAT and the second RAT are in a connected state. The electronic device 101 may acquire information about an operation state of the first communication module (e.g., the first CP 422a) based on the first RAT and information about an operation state of the second communication module (e.g., the second CP 442b) based on the second RAT, and may identify whether the first RAT and the second RAT are in a connected state, based on the acquired information. If the first RAT and the second RAT are not in a connected state, the electronic device 101 ends the operation.

If the first RAT and the second RAT are in a connected state, in step 905, the electronic device 101 acquires information related to the first RAT and the second RAT. For example, the electronic device 101 may identify the first band used for the first RAT and the second band used for the second RAT. Additionally or alternatively, the electronic device 101 may identify the number of bands used for the first RAT and the second RAT.

In step 907, the electronic device 101 identifies whether multi-band transmission is performed using the first RAT. According to at least some of the transmission schemes supported by the first RAT, the electronic device 101 may transmit signals using a plurality of bands. For example, multi-band transmission may be used depending on whether CA or DC is performed.

If multi-band transmission is not performed, in step 909, the electronic device 101 identifies interference relationship information about adjacent and harmonic components. If multi-band transmission is performed, in step 911, the electronic device 101 identifies the interference relationship information about the intermodulation component. The electronic device 101 may read the interference relationship information stored in the memory 130. Since the interference relationship information may be defined for a case of transmitting a signal in one hand and a case of transmitting signals in a plurality of bands, the electronic device 101 may identify corresponding interference relationship information according to whether multi-band transmission is performed. If the interference relationship information includes information about a plurality of designs, the electronic device 101 may identify a subset valid for the electronic device 101 from the interference relationship information.

In step 913, the electronic device 101 determines whether it is in a situation in which interference occurs. The electronic device 101 may identify whether the combination of at least one band used for the first RAT and a band used for the second RAT is a combination designated as having an interference relationship, based on the interference relationship information or a subset of the interference relationship information. If the electronic device 101 is not in a situation in which interference occurs, the electronic device 101 ends the operation.

If the electronic device 101 is in a situation in which interference occurs, in step 915, the electronic device 101 changes the channel of the second RAT. The electronic device 101 may control the second communication module to use a band other than the second band. For example, the electronic device 101 may block the second band or transmit a signal allowing change of a channel to a serving node (e.g., an access point) of the second RAT.

Figure 10:
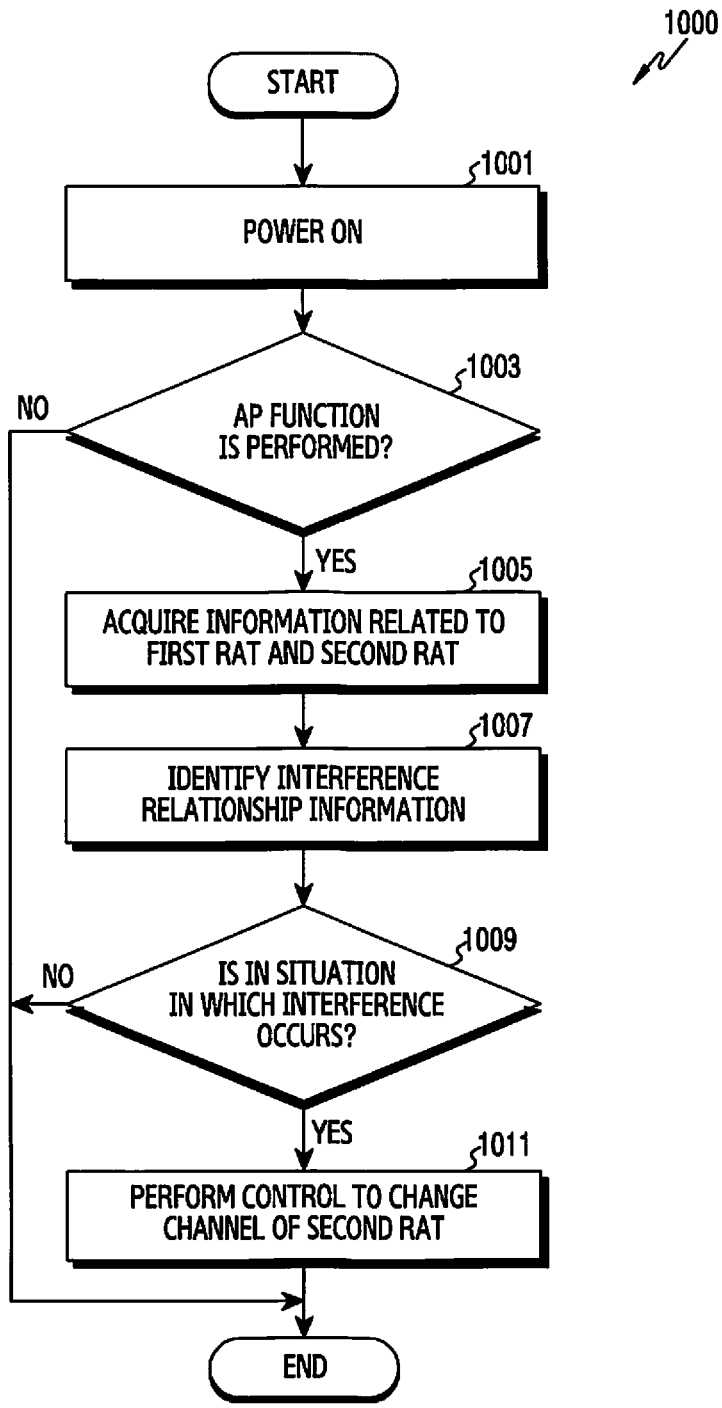
FIG. 10 is a flowchart illustrating an operation of controlling a frequency band for communication if an electronic device operates as an access point, according to an embodiment.

The electronic device 101 may perform a mobile hotspot function. If the mobile hotspot function is performed, the electronic device 101 may simultaneously use the first RAT and the second RAT, and perform the function of an access point. In case of performing the function of the access point, since the electronic device 101 has the authority to configure channels, the electronic device 101 may control the channel of the second RAT depending on whether the first RAF and the second RAT interfere with each other. With reference to FIG. 10, an embodiment in Which the electronic device 101 performs a mobile hotspot function is described below.

FIG. 10 is a flowchart 1000 illustrating an operation of controlling a frequency band for communication if an electronic device operates as an access point, according to an embodiment. The entity performing the operations in the flowchart 1000 illustrated in FIG. 10 may the electronic device 101 or an element (for example, the processor 120 or the control circuit 520) of the electronic device 101.

Referring to FIG. 10, in step 1001, the electronic device 101 (e.g., the processor 120 or the control circuit 520) is powered on. When a power button provided in the electronic device 101 is pressed, the electronic device 101 may be powered on.

In step 1003, the electronic device 101 identifies whether the access point function is performed. The access point function may denote a function of providing a tethering service, by the electronic device 101, to other electronic devices, based on a connection with a base station 210. If the access point function is performed, the first RAT and the second. RAT may be in a connected state. If the access point function is not performed, the electronic device 101 ends the operation.

If the access point function is performed, in step 1005, the electronic device 101 acquires information related to the first RAT and the second RAT. For example, the electronic device 101 may identify the first band used for the first RAT and the second band used for the second. RAT. Additionally or alternatively, the electronic device 101 may identify the number of bands used for the first RAT and the second RAT.

In step 1007, the electronic device 101 identifies the interference relationship information. The electronic device 101 may read the interference relationship information stored in the memory 130. If the interference relationship information includes information about a plurality of designs, the electronic device 101 may identify a subset valid for the electronic device 101 from the interference relationship information.

In step 1009, the electronic device 101 determines whether it is in a situation in which interference occurs. The electronic device 101 may identify whether a combination of the first hand and the second band, identified in step 1007, is a combination designated as having an interference relationship based on the interference relationship information or a subset of the interference relationship information. If the electronic device 101 is not in a situation in which interference occurs, the electronic device 101 ends the operation.

If the electronic device 101 is in a situation in which interference occurs, in step 1011, the electronic device 101 changes the channel of the second RAT. The electronic device 101 may control the second communication module to use a band other than the second band. For example, the electronic device 101 may block the second band or transmit a signal allowing change of a channel to a serving node (e.g., an access point) of the second RAT.

As described with reference to FIG. 10, since the electronic device 101 operates as an access point, the electronic device 101 may control channels of the second RAT. If signaling for channel change between the electronic device 101 and an external access point is supported, the channel change may occur even if the electronic device 101 does not operate as an access point. For example, if a function relating to channel change is implemented in chipsets for the second RAT, provided in the electronic device 101 and the external access point, the electronic device 101 transmits a signal requesting channel change to the access point and the channel change may occur under the control of the access point. An embodiment of a channel change occurring at the request of the electronic device 101 will be described with reference to FIG. 11.

Figure 11:
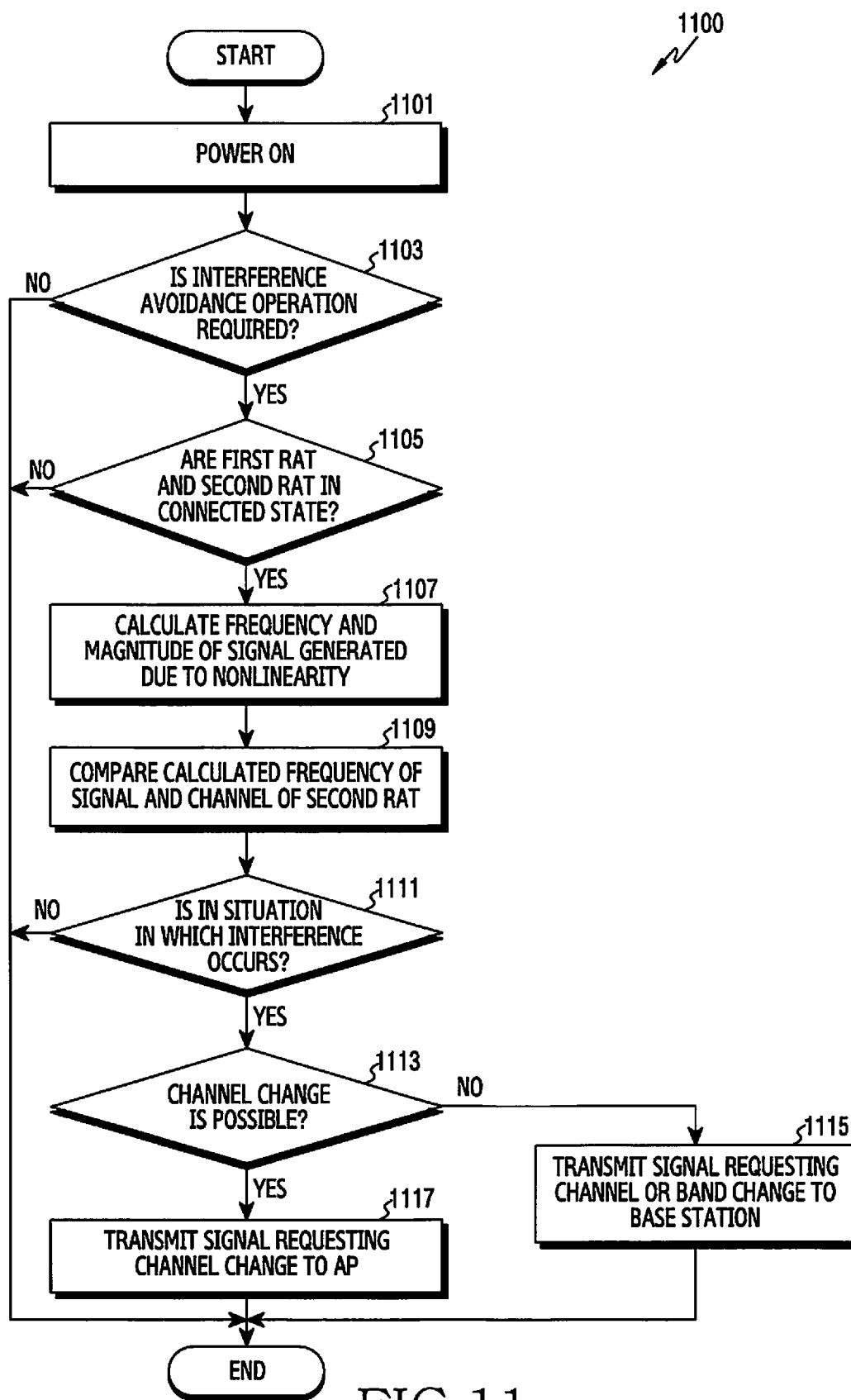
FIG. 11 is a flowchart illustrating an operation of controlling a frequency band for communication in consideration of whether a channel change function is supported in an electronic device, according to an embodiment.

FIG. 11 is a flowchart 1100 illustrating an operation of controlling a frequency band for communication in consideration of whether a channel change function is supported by an electronic device, according to an embodiment. The entity performing the operations in the flowchart 1100 illustrated in FIG. 11 may be the electronic device 101 or an element (e.g., the processor 120 or the control circuit 520) of the electronic device 101.

Referring to FIG. 11, in step 1101, the electronic device 101 (e.g., the processor 120 or the control circuit 520) is powered on. When a power button provided in the electronic device 101 is pressed, the electronic device 101 may be powered on.

In step 1103, the electronic device 101 determines whether an interference avoidance operation is required. The interference avoidance operation may be an operation of performing frequency band control to use a combination of bands which are not in an interference relationship. For example, if isolation between an antenna for transmitting a signal of the first RAT and an antenna for receiving a signal of the second RAT is secured, an interference avoidance operation may not be required. If an interference avoidance operation is not necessary, the electronic device 101 may end the operation.

If an interference avoidance operation is required, in step 1105, the electronic device 101 identifies whether the first RAT and the second RAT are in a connected state. The electronic device 101 may acquire information about an operation state of the first communication module (e.g., the first CP 422a) based on the first RAT and information about an operation state of the second communication module (e.g., the second CP 442b) based on the second RAT, and may identify whether the first RAT and the second RAT are in a connected state, based on the acquired information. If the first RAT and the second RAT are not in a connected state, the electronic device 101 ends the operation.

If the first RAT and the second RAT are in a connected state, in step 1107, the electronic device 101 calculates a frequency and a magnitude of a signal generated due to nonlinearity. The electronic device 101 may store, in a memory 130, information related to nonlinearity of a transmission circuit (for example, an amplifier) for the first RAT, and may calculate the frequency and/or the magnitude of the signal derived from the signal of the first RAT, based on the stored information.

In step 1109, the electronic device 101 compares the calculated frequency of the signal and the channel of the second RAT. Since the channel used for communication in the second RAT is allocated to a specific band, the electronic device 101 may identify whether the frequency of the signal, generated due to nonlinearity of the transmission circuit for the first RAT, is included in the band to which the channel for the second RAT is allocated.

In step 1111, the electronic device 101 determines whether it is in a situation in which interference occurs. The electronic device 101 may identify whether interference is applied to the second band used for the second RAT based on the characteristics of the derived signal calculated in step 1107. The electronic device 101 may determine whether it is in a situation in which interference occurs based on whether the calculated frequency of the signal is included in the second band, and based on the ratio of the magnitude of the derived signal to the magnitude of the signal of the second RAT. If the electronic device 101 is not in a situation in which interference occurs, the electronic device 101 ends the operation.

If the electronic device 101 is in a situation in which interference occurs, in step 1113, the electronic device 101 determines whether a channel change is possible. Whether a channel change is possible may be determined based on whether the access point supports the channel change function and/or whether the electronic device 101 supports the channel change function. For example, whether the access point supports the channel change function may be identified based on a signal (e.g., a probe signal) received from the access point.

If a channel change is not possible, in step 1115, the electronic device 101 transmits a signal requesting a channel or band change to the base station. Since the channel change of the second RAT is not possible, the electronic device 101 may remove the interference by changing the band used for the first RAT to another band. For example, the electronic device 101 may request handover to another band or change of the MVP For example, the electronic device 101 may transmit capability information excluding, from available BWPs, a BWP corresponding to a band currently being used.

If the channel change is possible, in step 1117, the electronic device 101 transmits a signal requesting the channel change to the access point. Since the channel change for the second RAT is possible, the electronic device 101 may remove the interference by changing the channel used for the second RAT to another channel. The electronic device 101 may receive a signal providing a notification of a channel change as a response to a signal requesting a channel change.

Figure 12:
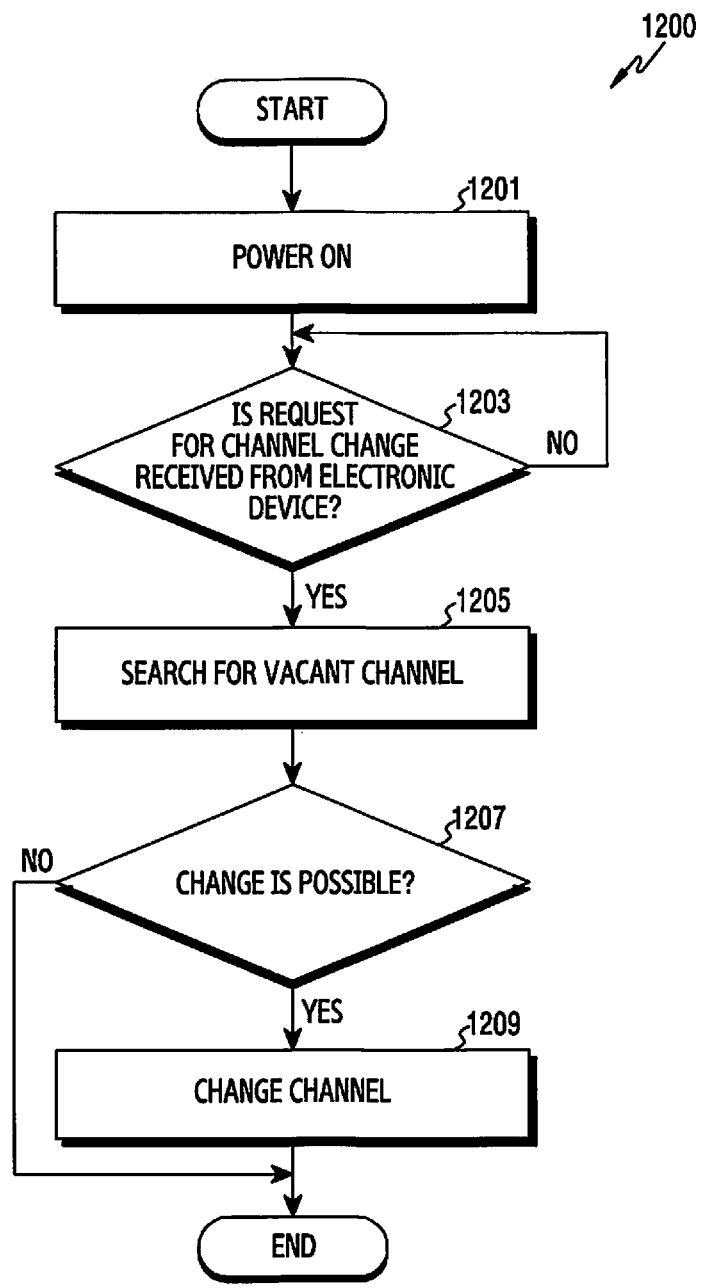
FIG. 12 is a flowchart illustrating an operation of changing a channel by an access point, according to an embodiment.

FIG. 12 is a flowchart 1200 illustrating an operation of changing a channel by an access point 220, according to an embodiment. The operation entity of the flowchart 1200 illustrated in FIG. 12 may be an access point 220 or an element (e.g., a processor) of the access point 220 of FIG. 2B.

Referring to FIG. 12, in step 1201, the access point 220 is powered on. By applying power to the access point 220, the access point 220 may be powered on. If power is turned on, the access point 220 may communicate with an electronic device 101.

In step 1203, the access point 220 identifies whether a request for a channel change is received from the electronic device 101. For example, while performing communication with the electronic device 101 through the first channel, the access point 202 may receive a signal requesting communication through another channel. If a request for a channel change is not received, the access point 202 monitors for reception of the request for a channel change in step 1203.

If the request for a channel change is received, in step 1205, the access point 220 searches for a vacant channel. The vacant channel may be a channel through which no electronic device is connected or a channel through which at least one electronic device is connected but for which a load is less than or equal to a threshold.

In step 1207, the access point 220 determines whether a channel change is possible. For example, the access point 220 may determine whether a channel change is possible depending on whether a vacant channel is found. If a channel change is not possible, the access point 220 ends the operation.

If a channel change is possible, in step 1209, the access point 220 changes the channel. The access point 220 may transmit, to the electronic device 101, information on a target channel and/or information indicating a time point at which channel change occurs.

Figure 13:
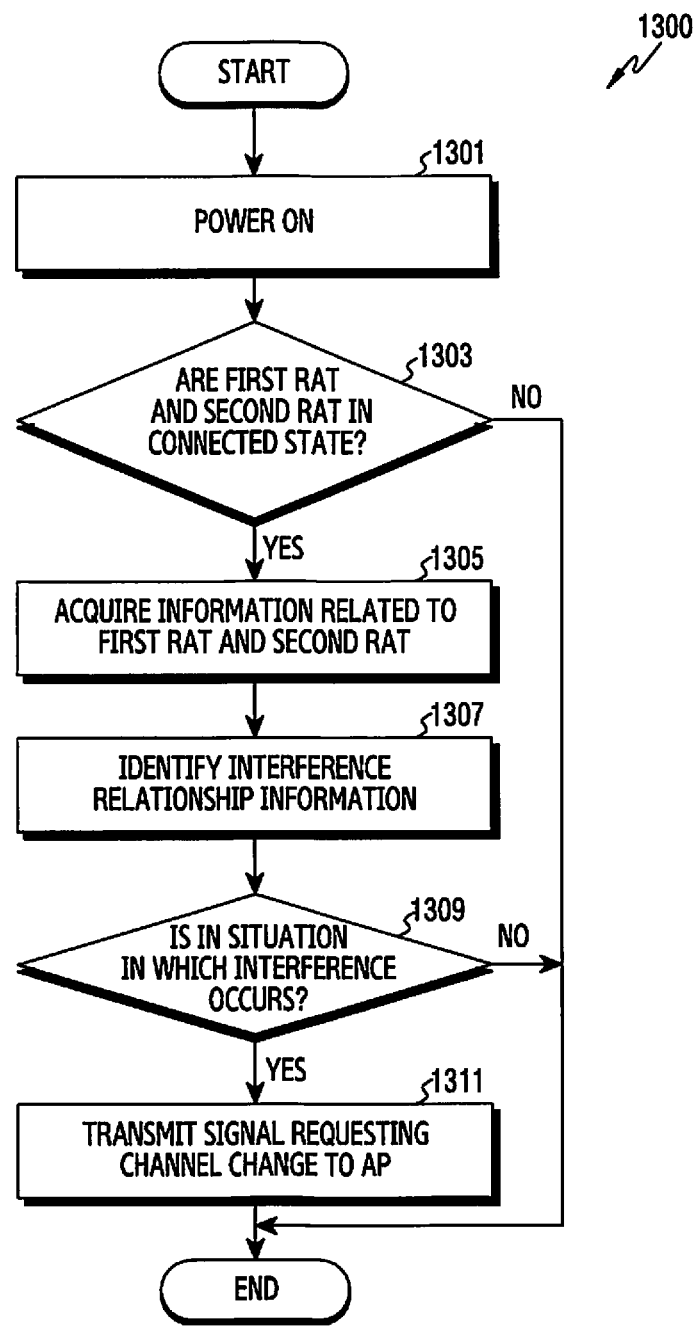
FIG. 13 is a flowchart illustrating an operation of controlling a frequency band for communication by requesting a channel change in an electronic device, according to an embodiment.

FIG. 13 is a flowchart 1300 illustrating an operation of controlling a frequency band for communication by requesting a channel change in an electronic device, according to an embodiment. The entity performing the operations in the flowchart 1300 illustrated in FIG. 13 may be the electronic device 101 or an element (e.g., the processor 120 or the control circuit 520) of the electronic device 101.

Referring to FIG. 13, in step 1301, the electronic device 101 (e.g., the processor 120 or the control circuit 520) is powered on. When a power button provided in the electronic device 101 is pressed, the electronic device 101 may be powered on.

In step 1303, the electronic device 101 identifies whether the first RAT and the second RAT are in a connected state. The electronic device 101 may acquire information about an operation state of the first communication module (e.g., the first CP 422a) based on the first RAT and information about an operation state of the second communication module (e.g., the second CP 442b) based on the second RAT, and may identify whether the first RAT and the second RAT are in a connected state based on the acquired information. If the first RAT and the second RAT are not in a connected state, the electronic device 101 ends the operation.

If the first RAT and the second RAT are in a connected state, in step 1305, the electronic device 101 acquires information related to the first RAT and the second RAT. For example, the electronic device 101 may identify the first band used for the first RAT and the second band used for the second RAT. Additionally or alternatively, the electronic device 101 may identify the number of bands used for the first RAT and the second RAT.

In step 1307, the electronic device 101 identifies the interference relationship information. The electronic device 101 may read the interference relationship information stored in the memory 130. If the interference relationship information includes information about a plurality of designs, the electronic device 101 may identify a subset valid for the electronic device 101 from the interference relationship information.

In step 1309, the electronic device 101 determines whether it is in a situation in which interference occurs. The electronic device 101 may identify whether the combination of the first band and the second band, identified in step 1307, is a combination designated as having an interference relationship, from the interference relationship information or a subset of the interference relationship information. If the electronic device 101 is not in a situation in which interference occurs, the electronic device 101 ends the operation.

If the electronic device 101 is in a situation in which interference occurs, in step 1311, the electronic device 101 transmits, to the access point, a signal requesting a channel change. For example, the electronic device 101 may transmit a signal requesting a channel change to change a channel used for the second RAT to another channel, so as to remove interference. The electronic device 101 may receive a signal providing a notification of a channel change as a response to a signal requesting a channel change.

As described with reference to FIG. 13, interference may be avoided by requesting a channel change. However, a function of changing a channel by requesting a channel change may not be implemented in one of the electronic device 101 and the access point 220. If one of the electronic device 101 and the access point 220 does not support the channel change function, the electronic device 101 may induce a channel change through another means. An embodiment in which a channel change operation differs depending on whether the channel change function is supported will be described with reference to FIG. 14.

Figure 14:
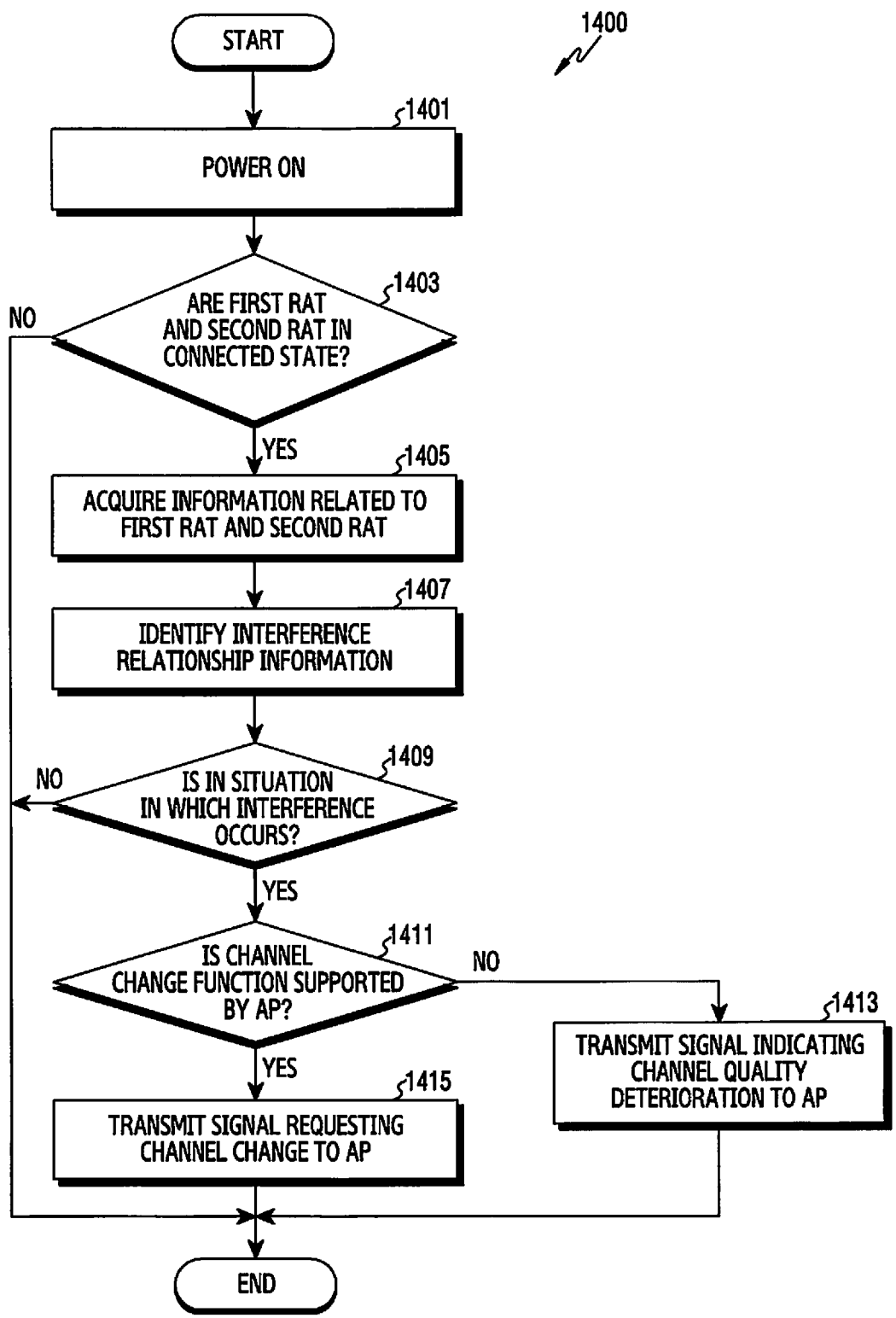
FIG. 14 is a flowchart illustrating an operation of controlling a frequency band for communication by requesting a channel change or using a channel quality report in an electronic device, according to an embodiment.

FIG. 14 is a flowchart 1400 illustrating an operation of controlling a frequency band for communication by requesting a channel change or using a channel quality report in an electronic device, according to an embodiment. The entity performing the operations in the flowchart 1400 illustrated in FIG. 14 may be the electronic device 101 or an element (e.g., the processor 120 or the control circuit 520) of the electronic device 101.

Referring to FIG. 14, in step 1401, the electronic device 101 (e.g., the processor 120 or the control circuit 520) is powered on. When a power button provided in the electronic device 101 is pressed, the electronic device 101 may be powered on.

In step 1403, the electronic device 101 identifies whether the first RAT and the second RAT are in a connected state. The electronic device 101 may acquire information about an operation state of the first communication module (e.g., the first CP 422a) based on the first RAT and information about an operation state of the second communication module (e.g., the second CP 442b) based on the second RAT, and may identify whether the first RAT and the second RAT are in a connected state based on the acquired information. If the first RAT and the second RAT are not in a connected state, the electronic device 101 ends the operation.

If the first RAT and the second RAT are in a connected state, in step 1405, the electronic device 101 acquires information related to the first RAT and the second RAT. For example, the electronic device 101 may identify the first band used for the first RAT and the second band used for the second RAT. Additionally or alternatively, the electronic device 101 may identify the number of bands used for the first RAT and the second RAT.

In step 1407, the electronic device 101 identifies the interference relationship information. The electronic device 101 may read the interference relationship information stored in the memory 130. If the interference relationship information includes information about a plurality of designs, the electronic device 101 may identify a subset valid for the electronic device 101 from the interference relationship information.

In step 1409, the electronic device 101 determines whether it is in a situation in which interference occurs. The electronic device 101 may identify whether a combination of the first band and the second band, identified in step 1407, is a combination designated as having an interference relationship, based on the interference relationship information or a subset of the interference relationship information. If the electronic device 101 is not in a situation in which interference occurs, the electronic device 101 ends the operation.

If the electronic device 101 is in a situation in which interference occurs, in step 1411, the electronic device 101 determines whether the channel change function is supported. Whether the channel change function is supported may be determined based on whether the access point 220 supports the channel change function and/or whether the electronic device 101 supports the channel change function. For example, whether the access point 220 supports the channel change function may be identified through a signal (e.g., a probe signal) received from the access point 220.

If the channel change function is not supported, in step 1413, the electronic device 101 transmits, to the access point 220, a signal indicating deterioration of channel quality. Since explicit channel change signaling is not supported, the electronic device 101 may induce a channel change by providing a notification that the quality of the channel currently being used is poor. For example, the electronic device 101 may transmit a signal indicating a channel quality value configured to a defined value (e.g., a minimum value).

If the channel change function is supported, in step 1415, the electronic device 101 transmits, to the access point 220, a signal requesting a channel change. Since the channel change function of the second. RAT is supported, the electronic device 101 may remove interference by changing the channel used for the second RAT to another channel. As a response to the signal requesting a channel change, the electronic device 101 may receive a signal providing a notification of a channel change.

According to an embodiment, an operation method of an electronic device may include determining whether a first communication module based on a first RAT and a second communication module based on a second RAT operate in a connected state determining whether a combination of a first band used by the first communication module and a second band used by the second communication module is a combination causing interference; and if the combination of the first band and the second band is a combination causing interference, transmitting a signal requesting to change one of the first band or the second band, wherein the interference is caused by at least one transmission signal of the first RAT or at least one other signal derived from the at least one transmission signal.

The at least one other signal derived from the at least one transmission signal may include at least one of a harmonic first component generated due to non-linearity of a transmission circuit for the first RAT and a second component generated due to IMD.

Determining whether the combination of the first band used by the first communication module and the second band used by the second communication module is a combination causing interference may include identifying, based on interference relationship information, whether the combination of the first band and the second band is a combination designated as having an interference relationship.

Determining whether the combination of the first band used by the first communication module and the second band used by the second communication module is a combination causing interference may include identifying, based on interference relationship information, whether the combination of the first band and the second band is a combination designated as having an interference relationship; and identifying whether a power of a transmission signal of the first RAT satisfies a condition designated by the interference relationship information.

Determining whether the combination of the first band used by the first communication module and the second band used by the second communication module is a combination causing interference may include determining a frequency and a magnitude of the at least one other signal, based on information about non-linearity of a transmission circuit for the first RAT; determining a magnitude of interference which the at least one other signal causes to the second band, based on an isolation level between a first antenna used for transmission of a signal of the first RAT and a second antenna used for reception of a signal of the second RAT; and identifying Whether the magnitude of interference satisfies a designated condition.

Transmitting the signal requesting to change one of the first band and the second band may include transmitting a signal requesting a channel change to an access point supporting the second RAT.

Transmitting the signal requesting to change one of the first band and the second band may include transmitting a signal indicating degradation of channel quality of the first band to a base station supporting the first RAT or a signal indicating degradation of channel quality of the second band to an access point supporting the second RAT.

Transmitting the signal requesting to change one of the first band and the second band may include transmitting, to a base station supporting the first RAT, a signal indicating a limitation in use of a BWP belonging to the first band.

Transmitting the signal requesting to change one of the first band or the second band may include identifying whether a channel change function of the second RAT is supported; and if the channel change function of the second RAT is not supported, transmitting a signal requesting to change the first band used for the first RAT to another band.

Transmitting the signal requesting to change one of the first band or the second band may include identifying whether a channel change function of the second RAT is supported; and if the channel change function of the second RAT is not supported, transmitting a signal indicating deterioration of channel quality of the second band to an access point supporting the second RAT.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B" "A, B, or C," "at least one of A. B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium, Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly if distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method of operating an electronic device, the method comprising:
    performing a first communication of a first radio access technology (RAT) using a first signal of a first frequency band, the first RAT including a cellular communication technology;
    performing a second communication of a second RAT using a second signal of a second frequency band, the second RAT including wireless local area network (WLAN);
    identifying a third frequency band of a third signal and a magnitude of the third signal, the third signal being derived from the first signal of the first frequency band; and
    if the identified third frequency band overlaps at least partially with the second frequency band and the identified magnitude of the third signal is over a specific value, changing the first frequency band for the first communication or the second frequency band for the second communication.

2. The method of claim 1, wherein the third signal derived from the first signal includes at least one of a harmonic first component generated due to non-linearity of a transmission circuit for the first RAT or a second component generated due to intermodulation distortion (IMD).

3. The method of claim 1, further comprising changing a frequency band for the first communication from the first frequency band to a fourth frequency band,
    wherein a combination of the fourth frequency band and the second frequency band is the combination that does not cause interference between the first communication and the second communication.

4. The method of claim 1, further comprising:
identifying, based on interference relationship information, whether a combination of the first frequency band and the second frequency band is the combination designated as having an interference relationship; and
identifying whether a power of the first signal of the first RAT satisfies a condition designated by the interference relationship information.

5. The method of claim 1, further comprising:
determining a magnitude of interference which the third signal causes to the second communication, based on an isolation level between a first antenna used for the first communication of the first RAT and a second antenna used for the second communication of the second RAT, and
determining whether the magnitude of interference satisfies a designated condition.

6. The method of claim 1, further comprising transmitting, to an access point supporting the second RAT, a request signal to change a communication channel.

7. The method of claim 1, further comprising transmitting a request signal indicating degradation of channel quality of the first frequency band to a base station supporting the first RAT or transmitting a request signal indicating degradation of channel quality of the second frequency band to an access point supporting the second RAT.

8. The method of claim 1, further comprising transmitting, to a base station supporting the first RAT, a request signal indicating a limitation for using a bandwidth part (BWP) belonging to the first frequency band.

9. The method of claim 1, further comprising:
identifying whether a channel change function of the second RAT is supported; and
if the channel change function of the second RAT is not supported, transmitting, to an access point, a request signal to change the first frequency band used for the first RAT to another frequency band.

10. The method of claim 1, further comprising:
identifying whether a channel change function of the second RAT is supported; and
if the channel change function of the second RAT is not supported, transmitting, to an access point supporting the second RAT, a request signal indicating deterioration of channel quality of the second frequency band.

11. An electronic device comprising:
a plurality of antennas;
a first communication module based on a first radio access technology (RAT) and a second communication module based on a second RAT, each of the first communication module and the second communication module being connected to at least one of the plurality of antennas, the first RAT including a cellular communication technology and the second RAT including wireless local area network (WLAN); and
at least one processor electrically connected to the first communication module and the second communication module,
wherein the at least one processor is configured to:
control the first communication module to perform a first communication of the first RAT through a first signal of a first frequency band using the at least one of the plurality of antennas,
control the second communication module to perform a second communication of the second RAT through a second signal of a second frequency band using the at least one of the plurality of antennas,
identify a third frequency band of a third signal and a magnitude of the third signal, the third signal being derived from the first signal of the first frequency band; and
if the identified third frequency band overlaps at least partially with the second frequency band and the identified magnitude of the third signal is over a specific value, change the first frequency band for the first communication or the second frequency band for the second communication.

12. The electronic device of claim 11, wherein the third signal derived from the first signal includes at least one of a harmonic first component generated due to non-linearity of a transmission circuit for the first RAT or a second component generated due to intermodulation distortion (IMD).

13. The electronic device of claim 11, wherein the at least one processor is further configured to change a frequency band for the first communication from the first frequency band to a fourth frequency band, and
wherein a combination of the fourth frequency band and the second frequency band is the combination that does not cause interference between the first communication and the second communication.

14. The electronic device of claim 11, wherein the at least one processor is further configured to:
identify, based on interference relationship information, whether a combination of the first frequency band and the second frequency band is the combination designated as having an interference relationship; and
identify whether a power of the first signal of the first RAT satisfies a condition designated by the interference relationship information.

15. The electronic device of claim 11, wherein the at least one processor is further configured to:
determine a magnitude of interference which the third signal causes to the second communication, based on an isolation level between a first antenna used for the first communication of the first RAT and a second antenna used for the second communication of the second RAT; and
determine whether the magnitude of interference satisfies a designated condition.

16. The electronic device of claim 11, wherein the at least one processor is further configured to transmit, to an access point supporting the second RAT, a request signal to change a communication channel.

17. The electronic device of claim 11, wherein the at least one processor is further configured to transmit a request signal indicating degradation of channel quality of the first frequency band to a base station supporting the first RAT or transmit a request signal indicating degradation of channel quality of the second frequency band to an access point supporting the second RAT.

18. The electronic device of claim 11, wherein the at least one processor is further configured to transmit, to a base station supporting the first RAT, a request signal indicating a limitation for using a bandwidth part (BWP) belonging to the first frequency band.

19. The electronic device of claim 11, wherein the at least one processor is further configured to:
identify whether a channel change function of the second RAT is supported; and
if the channel change function of the second RAT is not supported, transmit, to an access point, a request signal to change the first frequency band used for the first RAT to another frequency band.

20. The electronic device of claim 11, wherein the at least one processor is further configured to:
- identify whether a channel change function of the second RAT is supported; and
- if the channel change function of the second RAT is not supported, transmit, to an access point supporting the second RAT, a request signal indicating deterioration of channel quality of the second frequency band.

\* \* \* \* \*